US012784084B2

(12) United States Patent
Scully et al.

(10) Patent No.: US 12,784,084 B2
(45) Date of Patent: Nov. 3, 2026

(54) METHOD OF CUSTOMIZING AND DEMONSTRATING PRODUCTS IN A VIRTUAL ENVIRONMENT

(71) Applicant: Apple Inc., Cupertino, CA (US)

(72) Inventors: Brendan J. Scully, Cos Cob, CT (US); Alexander B. Oser, Minneapolis, MN (US); Wilson W. Yin, Cupertino, CA (US); Yang Liu, Sunnyvale, CA (US); Paul C. Hikiji, San Jose, CA (US); Maxime Montegnies, Alameda, CA (US); Weixuan Zhao, Santa Clara, CA (US); Wai Ki Chan, Mountain View, CA (US); Jaewoong Hwang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 41 days.

(21) Appl. No.: 18/587,657

(22) Filed: Feb. 26, 2024

(65) Prior Publication Data

US 2024/0273594 A1 Aug. 15, 2024

Related U.S. Application Data

(63) Continuation of application No. PCT/US2022/075479, filed on Aug. 25, 2022.

(Continued)

(51) Int. Cl.

| | |
|---|---|
| ***G06Q 30/00*** | (2023.01) |
| ***G06Q 30/0601*** | (2023.01) |
| ***G06T 19/20*** | (2011.01) |

(52) U.S. Cl.

CPC ..... *G06Q 30/0621* (2013.01); *G06Q 30/0643* (2013.01); *G06T 19/20* (2013.01); *G06T 2219/2004* (2013.01)

(58) Field of Classification Search

CPC ......... G06Q 30/0621; G06Q 30/06211; G06Q 30/06212; G06Q 30/0643; G06Q 30/0641;

(Continued)

(56) References Cited

U.S. PATENT DOCUMENTS 8,239,840 B1 * 8/2012 Czymontek ............... G06F 8/34 717/125

9,213,420 B2 12/2015 Amacker et al.

(Continued)

OTHER PUBLICATIONS

Threekit [online]. Retrieved from <https://www.threekit.com/platform-overview#solution>, [retrieved on Jun. 10, 2022], 20 pages.

(Continued)

*Primary Examiner* — Robert M Pond

(74) *Attorney, Agent, or Firm* — Kubota & Basol LLP

(57) ABSTRACT

Methods for providing a virtual shopping experience in which a demonstration of a product is presented to the user. In some embodiments, the demonstration is an interactive demonstration in a simulated virtual environment in which a user is able to interact with the device and the device is responsive to the simulated virtual environment. In some embodiments, the demonstration demonstrates one or more customizable features of the product. In some embodiments, (Continued)

a user is able to customize the features of the product, such as to customize the configuration and/or the parts of the product.

25 Claims, 13 Drawing Sheets

Related U.S. Application Data

(60) Provisional application No. 63/237,887, filed on Aug. 27, 2021.

(58) Field of Classification Search
CPC ....... G06Q 30/06431; G06Q 30/06432; G06Q 30/06433; G06Q 30/06434; G06Q 30/06435; G06Q 30/0644; G06Q 30/06442; G06Q 30/06443; G06Q 30/06444; G06T 19/20; G06T 2219/2004
USPC ...................................................... 705/26, 27
See application file for complete search history.

(56) References Cited

U.S. PATENT DOCUMENTS

| | | | | |
|---|---|---|---|---|
| 9,710,841 | B2 | 7/2017 | Ainsworth et al. | |
| 10,049,276 | B1 * | 8/2018 | Harper | G06V 30/142 |
| 11,250,617 | B1 * | 2/2022 | Sempe | H04L 65/611 |
| 11,417,179 | B1 | 8/2022 | Zalewski et al. | |
| 2009/0234716 | A1 | 9/2009 | Mallick et al. | |
| 2010/0030578 | A1 | 2/2010 | Siddique et al. | |
| 2012/0075168 | A1 | 3/2012 | Osterhout et al. | |
| 2012/0120214 | A1 | 5/2012 | Faranda et al. | |
| 2013/0110666 | A1 | 5/2013 | Aubrey | |
| 2013/0215116 | A1 | 8/2013 | Siddique et al. | |
| 2013/0293530 | A1 | 11/2013 | Perez et al. | |
| 2013/0297281 | A1 * | 11/2013 | Niemeyer | G06Q 30/0601 703/20 |
| 2014/0025529 | A1 | 1/2014 | Honeycutt et al. | |
| 2014/0229342 | A1 | 8/2014 | Marlowe et al. | |
| 2014/0363059 | A1 | 12/2014 | Hurewitz | |
| 2014/0365272 | A1 | 12/2014 | Hurewitz | |
| 2015/0309578 | A1 | 10/2015 | Mccoy et al. | |
| 2015/0371321 | A1 | 12/2015 | Chapuis et al. | |
| 2016/0026253 | A1 | 1/2016 | Bradski et al. | |
| 2016/0210602 | A1 | 7/2016 | Siddique et al. | |
| 2017/0132842 | A1 | 5/2017 | Morrison | |
| 2017/0249693 | A1 | 8/2017 | Greenwood et al. | |
| 2018/0040044 | A1 | 2/2018 | Mattingly et al. | |
| 2018/0204174 | A1 | 7/2018 | Soon-Shiong | |
| 2018/0232800 | A1 * | 8/2018 | Mattingly | G06F 3/011 |
| 2019/0065027 | A1 * | 2/2019 | Hauenstein | G06F 3/0484 |
| 2019/0266663 | A1 * | 8/2019 | Keeler | G06Q 30/0643 |
| 2019/0325498 | A1 | 10/2019 | Clark | |
| 2020/0225757 | A1 | 7/2020 | Schwarz et al. | |
| 2020/0302510 | A1 | 9/2020 | Chachek et al. | |
| 2020/0302693 | A1 | 9/2020 | Singh et al. | |
| 2021/0004137 | A1 | 1/2021 | Oser | |
| 2021/0133850 | A1 | 5/2021 | Ayush et al. | |
| 2021/0248669 | A1 | 8/2021 | Wade et al. | |
| 2021/0398316 | A1 | 12/2021 | Panse et al. | |
| 2022/0130126 | A1 | 4/2022 | Delgado et al. | |
| 2022/0374970 | A1 | 11/2022 | Bronicki | |
| 2022/0392171 | A1 * | 12/2022 | Baughman | G06T 19/006 |
| 2024/0062279 | A1 | 2/2024 | Scully et al. | |
| 2024/0273597 | A1 | 8/2024 | Scully et al. | |

OTHER PUBLICATIONS

KBMax [online]. Retrieved from the Internet: <https://web.archive.org/web/20201027065819/https://kbmax.com/solutions/cpq-for-b2b-ecommerce>, [retrieved on Feb. 2, 2025], 4 pages.

Audi R8 Augmented Reality Product Visualiser, Vimeo, uploaded by Engine Creative, Jul. 12, 2018 [online]. Retrieved from the Internet: <https://vimeo.com/279678041>, [retrieved on Feb. 2, 2025], 3 pages.

Configure One [online]. Retrieved from the Internet: <https://www.configureone.com>, [retrieved on Jun. 10, 2022], 9 pages.

Delphi AR App, Vimeo, uploaded by Engine Creative, Oct. 6, 2017 [online]. Retrieved from the Internet: <https://vimeo.com/237081043>, [retrieved on Feb. 2, 2025], 3 pages.

Fully Immersive VR Hot Tub Experience, Vimeo, uploaded by Engine Creative, Sep. 17, 2019 [online]. Retrieved from the Internet: <https://vimeo.com/360577724>, [retrieved on Feb. 2, 2025], 3 pages.

Gap Dressing Room AR APP By Avametric, Vimeo, uploaded by Ari Bloom, Jan. 7, 2017 [online]. Retrieved from the Internet: <https://vimeo.com/198481246>, [retrieved on Feb. 2, 2025], 3 pages.

HoloLens 2 AR Headset: On Stage Live Demonstration, YouTube, uploaded by UploadVR, Feb. 14, 2019 [online]. Retrieved from the Internet: <https://www.youtube.com/watch?v=uIHPPtPBgHK&t=154s>, [retrieved on Aug. 31, 2020], 1 page.

Powertrak Software, Axonom Inc. [online]. Retrieved from the Internet <https://www.axonom.com/powertrak>, [retrieved on Jun. 10, 2022], 7 pages.

Reydar—Modern Office Case Study with AR, Vimeo, uploaded by Engine Creative, Feb. 3, 2020 [online]. Retrieved from the Internet: <https://vimeo.com/389031426>, [retrieved on Feb. 2, 2025], 4 pages.

Virtual Reality for Automotive Dealerships, FlowFound [online]. Retrieved from the Internet: <https://web.archive.org/web/20200808024625/https://flowfound.com/virtual-reality/>, [retrieved on Jun. 23, 2023], 4 pages.

Álvarez Márquez, et al., "In-Store Augmented Reality-Enabled Product Comparison and Recommendation", Fourteenth ACM Conference on Recommender Systems, ACMPUB27, New York, <DOI: 10.1145/3383313.3412266>, Sep. 22, 2020, pp. 180-189.

Tudjarov, et al., "Web Virtual Reality for Product Customization", APEM Journal, vol. 4, 2009, pp. 25-34.

Magic Leap Augmented Reality Shopping and Voice Control, YouTube, uploaded by Road to VR, Jul. 22, 2016 [online]. Retrieved from the Internet: <https://www.youtube.com/watch?v=Z6Wa6DjHA98>, [retrieved on Dec. 5, 2024], 2 pages.

Morotti, et al. "Fostering Fashion Retail Experience Through Virtual Reality and Voice Assistants", 2020 IEEE Conference on Virtual Reality and 3D User Interfaces Abstracts and Workshops (VRW), Atlanta, GA, 2020, <DOI:10.1109/VRW50115.2020.00074>, pp. 338-342.

Non-Final Office Action received for U.S. Appl. No. 18/270,166, mailed on May 27, 2025, 15 pages.

Final Office Action received for U.S. Appl. No. 18/270,166, mailed on Oct. 27, 2025, 18 pages.

Non-Final Office Action received for U.S. Appl. No. 18/587,653, mailed on Jan. 5, 2026, 46 pages.

Notice of Allowance received for U.S. Appl. No. 18/270,166, mailed on Feb. 3, 2026, 11 pages.

Final Office Action received for U.S. Appl. No. 18/587,653, mailed on May 7, 2026, 32 pages.

* cited by examiner

500

METHOD OF CUSTOMIZING AND DEMONSTRATING PRODUCTS IN A VIRTUAL ENVIRONMENT

CROSS-REFERENCE TO RELATED APPLICATIONS

This application is a continuation of International Application No. PCT/US2022/075479, filed Aug. 25, 2022, which claims the benefit of U.S. Provisional Application No. 63/237,887, filed Aug. 27, 2021, the contents of which is herein incorporated by reference in their entirety for all purposes.

FIELD OF DISCLOSURE

This relates generally to methods for displaying demonstration of objects (e.g., products) in a virtual environment.

BACKGROUND OF THE DISCLOSURE

Computer-generated environments are environments where at least some objects displayed for a user's viewing are generated using a computer. Users may interact with a computer-generated environment, such as by browsing a virtual store and customizing and/or purchasing products.

SUMMARY OF THE DISCLOSURE

Some embodiments described in this disclosure are directed to methods displaying a demonstration of an object (e.g., a product) in a three-dimensional environment. Some embodiments described in this disclosure are directed to methods of customizing an object and displaying a demonstration of the custom components of the object. These interactions provide a more efficient and intuitive user experience. The full descriptions of the embodiments are provided in the Drawings and the Detailed Description, and it is understood that this Summary does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Figure 1:
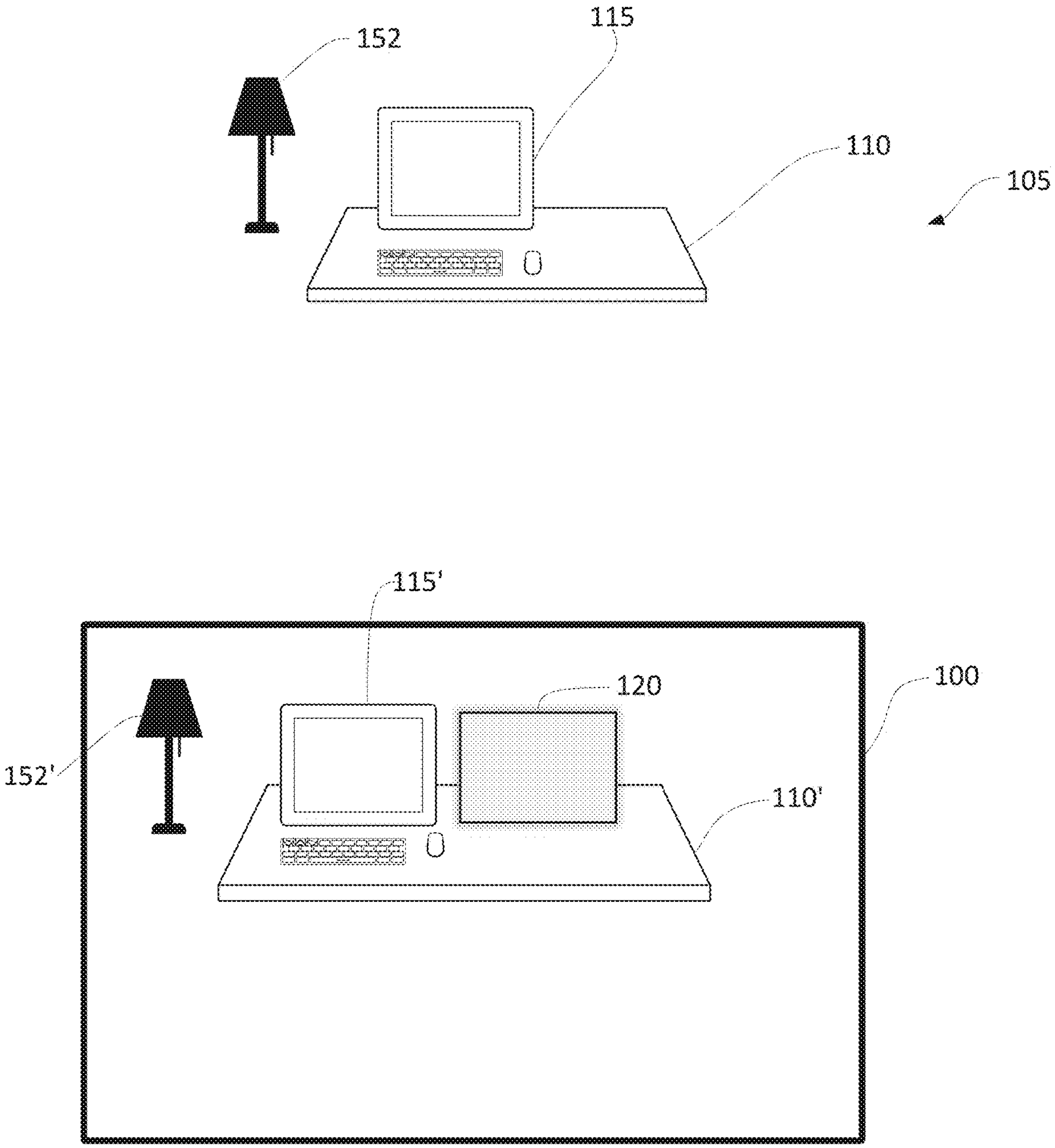
FIG. 1 illustrates an electronic device displaying an extended reality environment according to some embodiments of the disclosure.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments. Further, although the following description uses terms "first," "second," etc. to describe various elements, these elements should not be limited by the terms. These terms are only used to distinguish one element from another. For example, a respective representation could be referred to as a "first" or "second" representation, without implying that the respective representation has different characteristics based merely on the fact that the respective representation is referred to as a "first" or "second" representation. On the other hand, a representation referred to as a "first" representation and a representation referred to as a "second" representation are both representation, but are not the same representation, unless explicitly described as such.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, presenting an environment includes presenting a real-world environment, presenting a representation of a real-world environment (e.g., displaying via a display generation component), and/or presenting a virtual environment (e.g., displaying via a display generation component). Virtual content (e.g., user interfaces, content items, etc.) can also be presented with these environments (e.g., displayed via a display generation component). It is understood that as used herein the terms "presenting"/"presented" and "displaying"/"displayed" are often used interchangeably, but depending on the context it is understood that when a real world environment is visible to a user without being generated by the display generation component, such a real world environment is "presented" to the user (e.g., allowed to be viewable, for example, via a transparent or translucent material) and not necessarily technically "displayed" to the user.

Embodiments of electronic devices, user interfaces for such devices, and associated processes for using such devices are described. In some embodiments, the device is a portable communications device, such as a mobile telephone, that also contains other functions, such as personal digital assistant and/or music player functions. Other portable electronic devices, such as laptops or tablet computers with touch-sensitive surfaces (e.g., touch screen displays and/or touch pads), are optionally used. It should also be understood that, in some embodiments, the device is not a portable communications device, but is a desktop computer or a television with a touch-sensitive surface (e.g., a touch screen display and/or a touch pad). In some embodiments, the device does not have a touch screen display and/or a touch pad, but rather is capable of outputting display information (such as the user interfaces/computer generated environments of the disclosure) for display on a separate display device, and capable of receiving input information from a separate input device having one or more input mechanisms (such as one or more buttons, a touch screen display and/or a touch pad). In some embodiments, the device has a display, but is capable of receiving input information from a separate input device having one or more input mechanisms (such as one or more buttons, a touch screen display and/or a touch pad).

In the description herein, an electronic device that includes a display generation component for displaying a computer-generated environment optionally includes one or more input devices. In some embodiments, the one or more input devices includes a touch-sensitive surface as a means for the user to interact with the user interface or computer-generated environment (e.g., finger contacts and gestures on the touch-sensitive surface). It should be understood, however, that the electronic device optionally includes or receives input from one or more other input devices (e.g., physical user-interface devices), such as a physical keyboard, a mouse, a stylus and/or a joystick (or any other suitable input device).

In some embodiments, the one or more input devices can include one or more cameras and/or sensors that is able to track the user's gestures and interpret the user's gestures as inputs. For example, the user may interact with the user interface or computer-generated environment via eye focus (gaze) and/or eye movement and/or via position, orientation or movement of one or more fingers/hands (or a representation of one or more fingers/hands) in space relative to the user interface or computer-generated environment. In some embodiments, eye focus/movement and/or position/orientation/movement of fingers/hands can be captured by cameras and other sensors (e.g., motion sensors). In some embodiments, audio/voice inputs can be used to interact with the user interface or computer-generated environment captured by one or more audio sensors (e.g., microphones). Further, as described above, it should be understood that the described electronic device, display and touch-sensitive surface and/or other input devices/sensors are optionally distributed amongst two or more devices.

Therefore, as described herein, information displayed on the electronic device or by the electronic device is optionally used to describe information output by the electronic device for display on a separate display device (touch-sensitive or not). Similarly, as described herein, input received on the electronic device (e.g., touch input received on a touch-sensitive surface of the electronic device) is optionally used to describe input received on a separate input device, from which the electronic device receives input information.

The device typically supports a variety of applications that may be displayed in the computer-generated environment, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a content application (e.g., a photo/video management application), a digital camera application, a digital video camera application, a web browsing application, a digital music player application, a television channel browsing application, and/or a digital video player application.

The various applications that are executed on the device optionally use at least one common physical user-interface device, such as the touch-sensitive surface. One or more functions of the touch-sensitive surface as well as corresponding information displayed via the device are, optionally, adjusted and/or varied from one application to the next and/or within a respective application. In this way, a common physical architecture (such as the touch-sensitive surface or other input device/sensor) of the device optionally supports the variety of applications with user interfaces that are intuitive and transparent to the user.

Some embodiments described in this disclosure are directed to methods displaying a demonstration of an object (e.g., a product) in a three-dimensional environment. Some embodiments described in this disclosure are directed to methods of customizing an object and displaying a demonstration of the custom components of the object. These interactions provide a more efficient and intuitive user experience.

FIG. 1 illustrates an electronic device 100 displaying an extended reality (XR) environment (e.g., a computer-generated environment) according to embodiments of the disclosure. In some embodiments, electronic device 100 is a hand-held or mobile device, such as a tablet computer, laptop computer, smartphone, or head-mounted display. Additional examples of device 100 are described below with reference to the architecture block diagram of FIG. 2. As shown in FIG. 1, electronic device 100 and tabletop 110 are located in the physical environment 105. The physical environment may include physical features such as a physical surface (e.g., floor, walls) or a physical object (e.g., table, lamp, etc.). In some embodiments, electronic device 100 may be configured to capture areas of physical environment 105 including tabletop 110, lamp 152, desktop computer 115 and input devices 116 (illustrated in the field of view of electronic device 100). In some embodiments, in response to a trigger, the electronic device 100 may be configured to display a virtual object 120 in the computer-generated environment (e.g., represented by an application window illustrated in FIG. 1) that is not present in the physical environment 105, but is displayed in the computer-generated environment positioned on (e.g., anchored to) the top of a computer-generated representation 110' of real-world table top 110. For example, virtual object 120 can be displayed on the surface of the tabletop 110' in the computer-generated environment displayed via device 100 in response to detecting the planar surface of tabletop 110 in the physical environment 105.

It should be understood that virtual object 120 is a representative virtual object and one or more different virtual objects (e.g., of various dimensionality such as two-dimensional or three-dimensional virtual objects) can be included and rendered in a three-dimensional computer-generated environment. For example, the virtual object can represent an application or a user interface displayed in the computer-generated environment. In some embodiments, the virtual object 120 is optionally configured to be interactive and responsive to user input, such that a user may virtually touch, tap, move, rotate, or otherwise interact with, the virtual object. Additionally, it should be understood that, as used herein, the three-dimensional (3D) environment (or 3D virtual object) may be a representation of a 3D environment (or three-dimensional virtual object) projected or presented at an electronic device.

In the discussion that follows, an electronic device that is in communication with a display generation component and one or more input devices is described. It should be understood that the electronic device optionally is in communication with one or more other physical user-interface devices, such as touch-sensitive surface, a physical keyboard, a mouse, a joystick, a hand tracking device, an eye tracking device, a stylus, etc. Further, as described above, it should be understood that the described electronic device, display and/or touch-sensitive surface are optionally distributed amongst two or more devices. Therefore, as used herein, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device, or touch input received on the surface of a stylus) is optionally used to describe input received on a separate input device, from which the electronic device receives input information.

In some embodiments, the electronic device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

Figure 2:
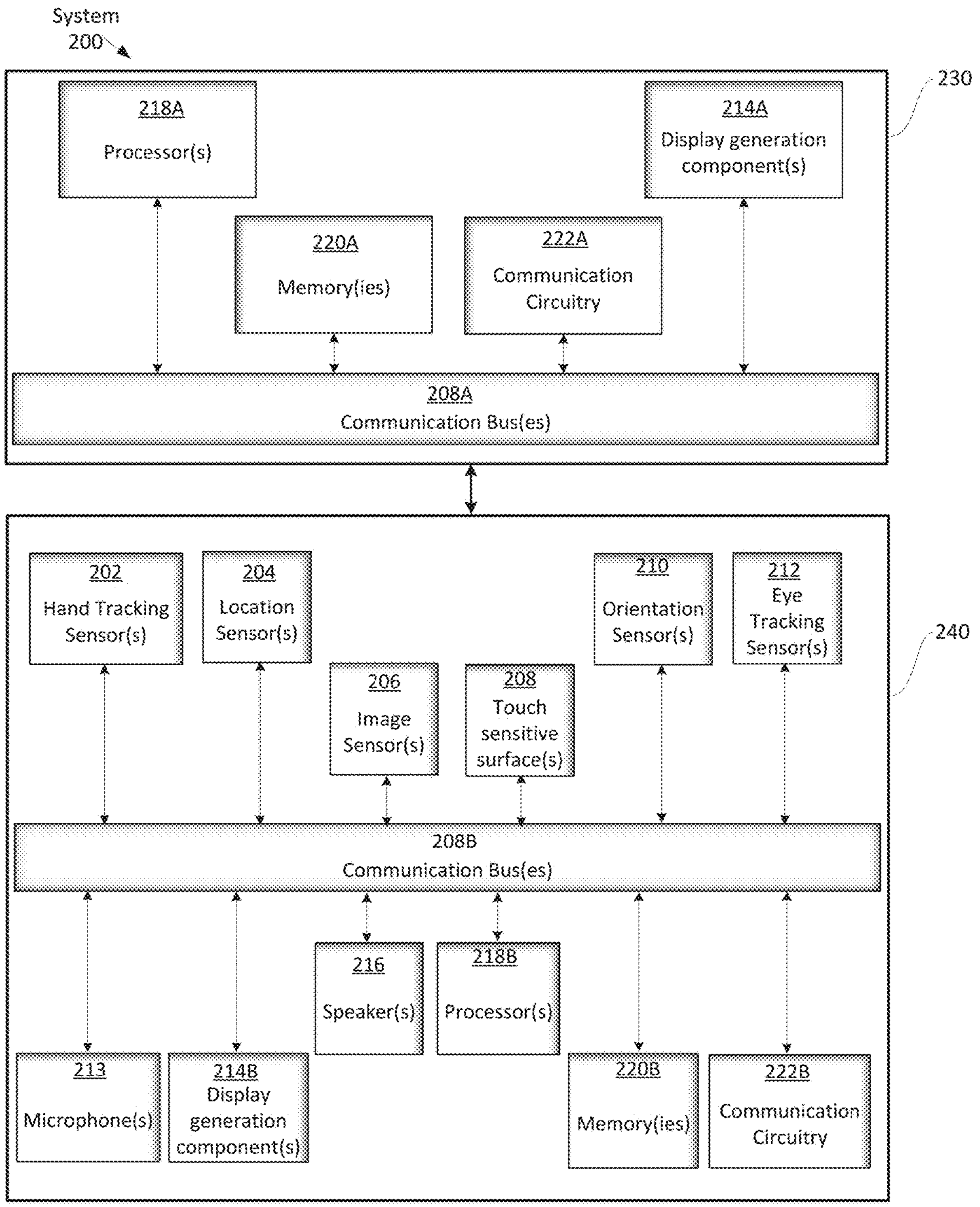
FIG. 2 illustrates a block diagram of an exemplary architecture for a system or device in accordance with some embodiments of the disclosure.

FIG. 2 illustrates a block diagram of an exemplary architecture for a system or device 220 according to embodiments of the disclosure. In some embodiments, device 200 is a mobile device, such as a mobile phone (e.g., smart phone), a tablet computer, a laptop computer, a desktop computer, a head-mounted display, an auxiliary device in communication with another device, etc. In some embodiments, device 200 includes various sensors (e.g., one or more hand tracking sensor(s), one or more location sensor(s), one or more image sensor(s), one or more touch-sensitive surface(s), one or more motion and/or orientation sensor(s), one or more eye tracking sensor(s), one or more microphone(s) or other audio sensors, etc.), one or more display generation component(s), one or more speaker(s), one or more processor(s), one or more memories, and/or communication circuitry. One or more communication buses are optionally used for communication between the above-mentioned components of device 200.

In some embodiments, as illustrated in FIG. 2, system/device 200 can be divided between multiple devices. For example, a first device 230 optionally includes processor(s) 218A, memory or memories 220A, communication circuitry 222A, and display generation component(s) 214A optionally communicating over communication bus(es) 208A. A second device 240 (e.g., corresponding to device 200) optionally includes various sensors (e.g., one or more hand tracking sensor(s) 202, one or more location sensor(s) 204, one or more image sensor(s) 206, one or more touch-sensitive surface(s) 209, one or more motion and/or orientation sensor(s) 210, one or more eye tracking sensor(s) 212, one or more microphone(s) 213 or other audio sensors, etc.), one or more display generation component(s) 214B, one or more speaker(s) 216, one or more processor(s) 218B, one or more memories 220B, and/or communication circuitry 222B. One or more communication buses 208B are optionally used for communication between the above-mentioned components of device 240. In some embodiments, first device 230 and second device 240 communicate via a wired or wireless connection (e.g., via communication circuitry 222A-222B) between the two devices.

Communication circuitry 222A, 222B optionally includes circuitry for communicating with electronic devices, networks, such as the Internet, intranets, a wired network and/or a wireless network, cellular networks, and wireless local area networks (LANs). Communication circuitry 222A, 222B optionally includes circuitry for communicating using near-field communication (NFC) and/or short-range communication, such as Bluetooth®.

Processor(s) 218A, 218B may include one or more general processors, one or more graphics processors, and/or one or more digital signal processors. In some embodiments, memory 220A, 220B is a non-transitory computer-readable storage medium (e.g., flash memory, random access memory, or other volatile or non-volatile memory or storage) that stores computer-readable instructions configured to be executed by processor(s) 218A, 218B to perform the techniques, processes, and/or methods described below. In some embodiments, memory 220A, 220B can include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some embodiments, the storage medium is a transitory computer-readable storage medium. In some embodiments, the storage medium is a non-transitory computer-readable storage medium. For example, the non-transitory computer-readable storage medium can include, but is not limited to, magnetic, optical, and/or semiconductor storages. In some embodiments, such storage may include magnetic disks, optical discs based on CD, DVD, or Blu-ray technologies, as well as persistent solid-state memory such as flash, solid-state drives, and the like.

In some embodiments, display generation component(s) 214A, 214B include a single display (e.g., a liquid-crystal display (LCD), organic light-emitting diode (OLED), or other types of display). In some embodiments, display generation component(s) 214A, 214B includes multiple displays. In some embodiments, display generation component(s) 214A, 214B can include a display with touch capability (e.g., a touch screen), a projector, a holographic projector, a retinal projector, etc. In some embodiments, device 240 includes touch-sensitive surface(s) 209 for receiving user inputs, such as tap inputs and swipe inputs or other gestures. In some embodiments, display generation component(s) 214B and touch-sensitive surface(s) 209 form touch-sensitive display(s) (e.g., a touch screen integrated with device 240 or external to device 240 that is in communication with device 240).

Device 240 optionally includes image sensor(s) 206. In some embodiments, image sensors(s) 206 optionally include one or more visible light image sensors, such as charged coupled device (CCD) sensors, and/or complementary metal-oxide-semiconductor (CMOS) sensors operable to obtain images of physical objects from the real-world environment. Image sensor(s) 206 also optionally include one or more infrared (IR) sensors, such as a passive or an active IR sensor, for detecting infrared light from the real-world environment. For example, an active IR sensor includes an IR emitter for emitting infrared light into the real-world environment. Image sensor(s) 206 also optionally include one or more cameras configured to capture movement of physical objects in the real-world environment. Image sensor(s) 206 also optionally include one or more depth sensors configured to detect the distance of physical objects from device 240. In some embodiments, information from one or more depth sensors can allow the device to identify and differentiate objects in the real-world environment from other objects in the real-world environment. In some embodiments, one or more depth sensors can allow the device to determine the texture and/or topography of objects in the real-world environment.

In some embodiments, device 240 uses CCD sensors, event cameras, and depth sensors in combination to detect the physical environment around device 240. In some embodiments, image sensor(s) 206 include a first image sensor and a second image sensor. The first image sensor and the second image sensor work in tandem and are optionally configured to capture different information of physical objects in the real-world environment. In some embodiments, the first image sensor is a visible light image sensor, and the second image sensor is a depth sensor. In some embodiments, device 240 uses image sensor(s) 206 to detect the position and orientation of device 240 and/or display generation component(s) 214 in the real-world environment. For example, device 240 uses image sensor(s) 206 to track the position and orientation of display generation component(s) 214B relative to one or more fixed objects in the real-world environment.

In some embodiments, device 240 includes microphone(s) 213 or other audio sensors. Device 240 uses microphone(s) 213 to detect sound from the user and/or the real-world environment of the user. In some embodiments, microphone(s) 213 includes an array of microphones (a plurality of microphones) that optionally operate in tandem, such as to identify ambient noise or to locate the source of sound in space of the real-world environment.

Device 240 includes hand tracking sensor(s) 202 and/or eye tracking sensor(s) 212, in some embodiments. Hand tracking sensor(s) 202 are configured to track the position/location of one or more portions of the user's hands, and/or motions of one or more portions of the user's hands with respect to the extended reality environment, relative to the display generation component(s) 214B, and/or relative to another defined coordinate system. In some embodiments, eye tracking senor(s) 212 are configured to track the position and movement of a user's gaze (eyes, face, or head, more generally) with respect to the real-world or extended reality environment and/or relative to the display generation component(s) 214B. In some embodiments, hand tracking sensor(s) 202 and/or eye tracking sensor(s) 212 are implemented together with the display generation component(s) 214B. In some embodiments, the hand tracking sensor(s) 202 and/or eye tracking sensor(s) 212 are implemented separate from the display generation component(s) 214B.

In some embodiments, the hand tracking sensor(s) 202 can use image sensor(s) 206 (e.g., one or more IR cameras, 3D cameras, depth cameras, etc.) that capture three-dimensional information from the real-world including one or more hands (e.g., of a human user). In some embodiments, the hands can be resolved with sufficient resolution to distinguish fingers and their respective positions. In some embodiments, one or more image sensor(s) 206 are positioned relative to the user to define a field of view of the image sensor(s) 206 and an interaction space in which finger/hand position, orientation and/or movement captured by the image sensors are used as inputs (e.g., to distinguish from a user's resting hand or other hands of other persons in the real-world environment). Tracking the fingers/hands for input (e.g., for detecting gestures, touch, tap, etc.) can be advantageous in that it does not require the user to touch, hold or wear any sort of beacon, sensor, or other marker.

In some embodiments, eye tracking sensor(s) 212 includes at least one eye tracking camera (e.g., infrared (IR) cameras) and/or illumination sources (e.g., IR light sources, such as LEDs) that emit light towards a user's eyes. The eye tracking cameras may be pointed towards a user's eyes to receive reflected IR light from the light sources directly or indirectly from the eyes. In some embodiments, both eyes are tracked separately by respective eye tracking cameras and illumination sources, and a focus/gaze can be determined from tracking both eyes. In some embodiments, one eye (e.g., a dominant eye) is tracked by a respective eye tracking camera/illumination source(s).

Device 240 includes location sensor(s) 204 for detecting a location of device 240 and/or display generation component(s) 214B. For example, location sensor(s) 204 can include a GPS receiver that receives data from one or more satellites and allows device 240 to determine the device's absolute position in the physical world.

Device 240 includes orientation sensor(s) 210 for detecting orientation and/or movement of device 240 and/or display generation component(s) 214B. For example, device 240 uses orientation sensor(s) 210 to track changes in the position and/or orientation of device 240 and/or display generation component(s) 214B, such as with respect to physical objects in the real-world environment. Orientation sensor(s) 210 optionally include one or more gyroscopes and/or one or more accelerometers.

It should be understood that system/device 200 is not limited to the components and configuration of FIG. 2, but can include fewer, alternative, or additional components in multiple configurations. In some embodiments, system 200 can be implemented in a single device. A person using system 200, is optionally referred to herein as a user of the device.

Figure 3A:
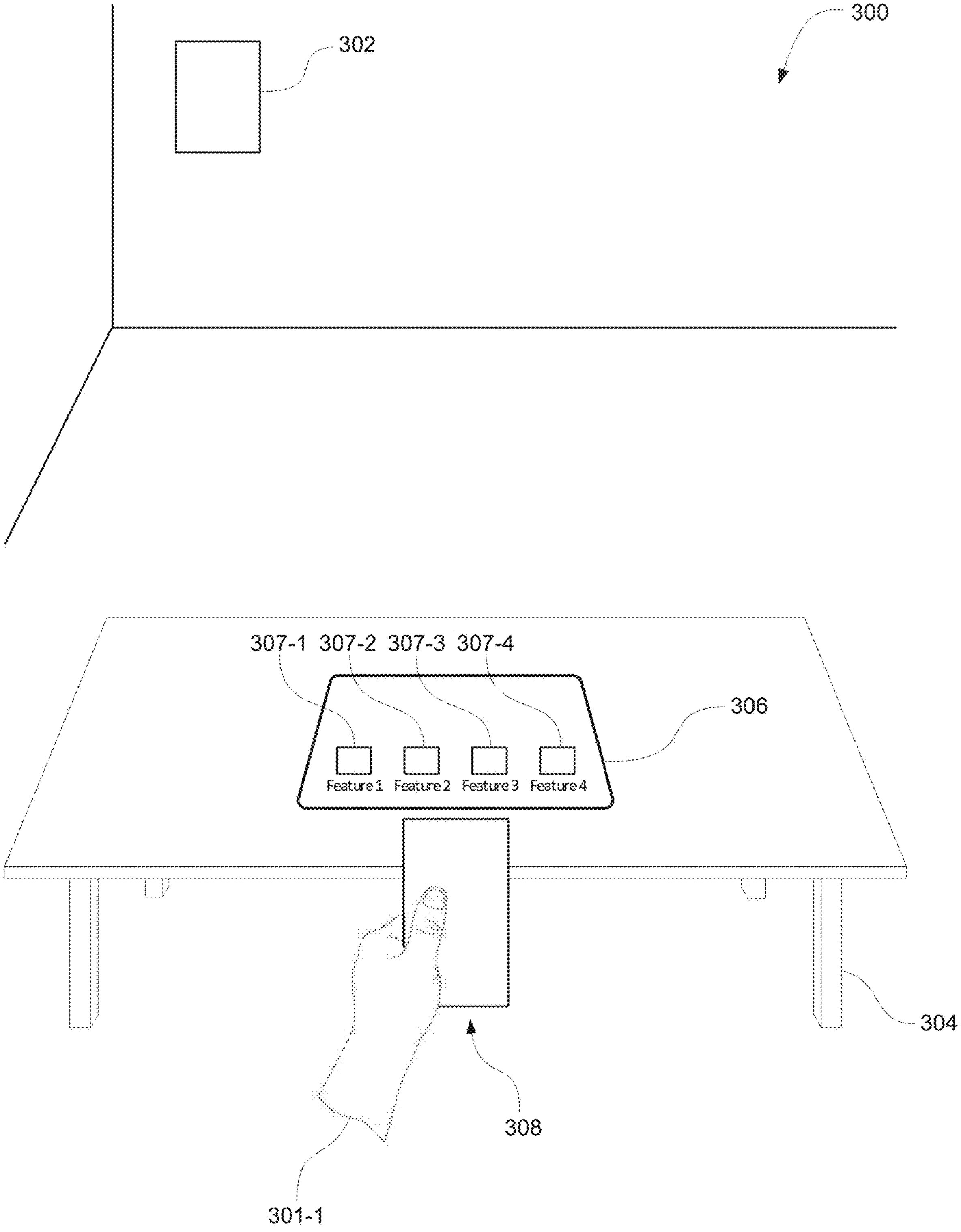
FIGS. 3A-3D illustrate a method of demonstrating features of an object (e.g., a product) according to some embodiments of the disclosure.

FIGS. 3A-3D illustrate a method of demonstrating features of an object (e.g., a product) according to some embodiments of the disclosure. FIG. 3A illustrates three-dimensional environment 300 (e.g., a computer-generated environment, an extended reality environment, etc.) that is being displayed (e.g., provided) by a display generation component of an electronic device (e.g., such as electronic device 100 and/or device 200 described above with respect to FIG. 1 and FIG. 2).

In some embodiments, three-dimensional environment 300 includes one or more real-world objects (e.g., representations of objects in the physical environment around the device) and/or one or more virtual objects (e.g., representations of objects generated and displayed by the device that are not necessarily based on real-world objects in the physical environment around the device). For example, in FIG. 3A, table 304 and picture frame 302 can both be representations of real-world objects in the physical environment around the device (e.g., table 304 and picture frame 302 exist in the physical environment). In some embodiments, table 304 and picture frame 302 are displayed by the display generation component by capturing one or more images of table 304 and picture frame 302 (e.g., using one or more sensors of the electronic device, such as a camera and/or a depth sensor) and displaying a representation of the table and picture frame (e.g., a photorealistic representation, a simplified representation, a caricature, etc.), respectively, in three-dimensional environment 300. In some embodiments, table 304 and picture frame 302 are displayed in three-dimensional environment 300 at a location such that it appears in the same or a similar location as the real world table and picture frame (e.g., the same distance from the user, from the same perspective, etc.). In some embodiments, table 304 and picture frame 302 are passively provided by the device via a transparent or translucent display (e.g., by not obscuring the user's view of table 304 and picture frame 302, thus allowing table 304 and picture frame 302 to be visible to the user through the transparent or translucent display). In some embodiments, table 304 and/or picture frame 302 are virtual objects that exist in three-dimensional environment 300, but not in the real-world environment (e.g., physical environment) around the device. For example, the electronic device can generate a virtual table and display the virtual table as table 304 in three-dimensional environment 300 to appear as if table 304 is physically in the room with the user.

In some embodiments, extended reality environments (e.g., such as three-dimensional environment 300) are able to provide a virtual retail experience by displaying one or more object (e.g., product) displays, in a manner similar to a physical retail store (e.g., a brick-and-mortar store). In some embodiments, the virtual retail experience can provide the user with the ability to demonstrate (e.g., "test drive") one or more features of a product, for example, as if the user were physically in a physical retail store and physically manipulating a product (e.g., with one or more hands). For example, a virtual retail experience for a smartphone product can provide the user with a demonstration of the camera system, a virtual retail experience for headphones can provide the user with a demonstration of the noise cancellation features of the headphones, etc. In some embodiments, the demonstration can include a partially or fully immersive experience, as will be described in more detail below.

In FIG. 3A, an object station (e.g., product station 306) can be displayed on table 304 (e.g., which can be a physical object or a virtual object, as discussed above). In some embodiments, product station 306 can be a virtual object that is generated by the electronic device and displayed in three-dimensional environment 300 to appear as if it is placed on the top surface of table 304. In some embodiments, product station 306 mimics a product placemat or product display area in a real-world retail store. In FIG. 3A, product station 306 is a three-dimensional object similar to a placemat (e.g., a flat, planar surface), upon which one or more virtual objects can be placed. In some embodiments, other shapes and sizes are possible for product station 306, such as a basket, a bowl, a rack, etc.

In some embodiments, product station 306 is associated with one type of product, one product model, one product SKU, etc. For example, in FIG. 3A, product station 306 is associated with a respective smartphone model. In some embodiments, product station 306 includes representation 308 of the respective smartphone model (e.g., located on the surface of product station 306, floating above product station 306, etc.) that the user is able to interact with and/or pick up and remove from product station 306 using hand 301-1, as shown in FIG. 3A. In some embodiments, representation 308 is a three-dimensional object that has a size and/or shape that is based on the respective smartphone model (e.g., representation 308 has the same size and/or shape as the smartphone of which it is a representation). In other embodiments, product station 306 can be associated with an assortment of product types or product models. Representations of multiple product types or models can be presented on the surface of product station 306, floating above the product station, etc. For example, an array of smartphone models or an assortment of different products (e.g., a smartphone, a watch, smart speaker, etc.) to illustrate product ecosystems.

Because representation 308 is a three-dimensional object, the user is optionally able to move around in three-dimensional environment 300 (e.g., by physical walking around in the real-world environment) and view representation 308 from different angles and perspectives (e.g., from the side, from behind, from the top, etc.). In some embodiments, the user is able to use one or more hands to pick up representation 308 to inspect representation 308. For example, in FIG. 3A, hand 301-1 of the user has reached out and picked up representation 308 and moved representation 308 off of product station 306 (e.g., removed representation 308 from product station 306). In some embodiments, while hand 301-1 is holding representation 308 (e.g., while hand 301-1 is maintaining a gripping posture), representation 308 moves around three-dimensional environment 300 in accordance with the movement of hand 301-1. For example, if hand 301-1 moves rightwards, representation 308 moves rightwards to appear as if hand 301-1 is physically holding representation 308 and if hand 301-1 moves leftwards, representation 308 moves leftwards with the movement of hand 301-1.

In some embodiments, product station 306 can include one or more representations of one or more features associated with the respective smartphone model (e.g., the product on display) for which more information is available. In FIG. 3A, product station 306 includes representations 307-1 to 307-4 corresponding to Feature 1 to Feature 4 of the respective smartphone model. Any number of features can be displayed (e.g., featured) on product station 306 (e.g., based on the desire and design of the retailer of the virtual retail store) or no features can be displayed on product station 306. In some embodiments, representations 307-1 to 307-4 can be hidden until the user performs a trigger to cause representations 307-1 to 307-4 to be displayed. In some embodiments, the trigger can include the user approaching product station 306 (e.g., approaching to within 2 feet, 3 feet, 4 feet, etc.), the user looking at product station 306, and/or the user reaching one or more hands towards product station 306 (e.g., optionally reaching to within 1 inch, 6 inches, 1 foot, 2 feet, etc. of product station 306). Hiding representations 307-1 to 307-4 can provide a simple and clean product display when the user has not indicated an interest in the product. In some embodiments, table 304 can include a plurality of product stations, each of which is associated with a different product model or a different product type, and when the user approaches a respective product station and/or interacts with a respective product station, the representations of features can appear and thus provide the user with additional information only when desired. In some embodiments, representations 307-1 to 307-4 are always displayed, regardless of whether the user has approached product station 306 or is interacting with product station 306.

In some embodiments, representations 307-1 to 307-4 are two-dimensional or three-dimensional virtual objects and can be icons, graphics, images, or any other object corresponding to its respective feature. For example, the representation for a camera feature can be a three-dimensional model of a camera, the representation for a processor can be a three-dimensional model of an integrated circuit, the representation for a cellular technology (e.g., 3G, 4G, 5G, etc.) can be a three-dimensional antenna, etc. Similar to representation 308, representations 307-1 to 307-4 can be floating above product station 306, or can be placed on product station 306, etc. In some embodiments, representations 307-1 to 307-4 can be displayed as if they are lying flat on product station 306 and upon detecting that the user has approached product station 306 (e.g., approached to within a threshold distance, such as 1 foot, 2 feet, 3 feet, etc.), upon detecting that the gaze of the user is directed to product station 306 (e.g., the one or more eye tracking sensors of the electronic device detect that the user is looking at or near product station 306), and/or upon detecting that one or more hands of the user has reached out towards product station 306, representations 307-1 to 307-4 can appear to stand upright (e.g., animate from a lying-down position to an upright position, optionally floating in air above product station 306). In some embodiments, animating representations 307-1 to 307-4 when the user shows an interest in product station 306 can catch the user's attention, indicating to the user that one or more featured features exist and that the user can interact with the representations to learn more about the features.

As shown in FIG. 3A, representations 307-1 to 307-4 can be accompanied with a feature description and/or feature name. In some embodiments, the feature description and/or feature name is a three-dimensional object that behaves in a manner similar to representations 307-1 to 307-4. In some embodiments, representations 307-1 to 307-4 are placed at a location on product station 306 in front of representation 308 (e.g., at a shallower depth and/or closer to the user than representation 308).

In some embodiments, the system can provide the user with a demonstration of one or more of the features of the product associated with product station 306. In some embodiments, the user can trigger the demonstration by performing a respective gesture or other user input associated with a request to display a demonstration. In some embodiments, the user is able to select which feature to demonstrate by, for example, selecting a respective feature from representations 307-1 to 307-4. In some embodiments, the respective gesture to trigger a demonstration of the product can include raising representation 308 to a respective height with respect to the user (e.g., raising up to eye level, raising up to chest level, etc.). In some embodiments, other types of gestures and/or inputs are possible, such as a selection of an affordance to begin a demonstration and/or the issuance of a voice command requesting display of the demonstration. In some embodiments, the electronic device can provide an audio output instructing the user of how to trigger the demonstration (e.g., a voice saying "raise the smartphone to start a demonstration of the camera system").

Figure 3B:
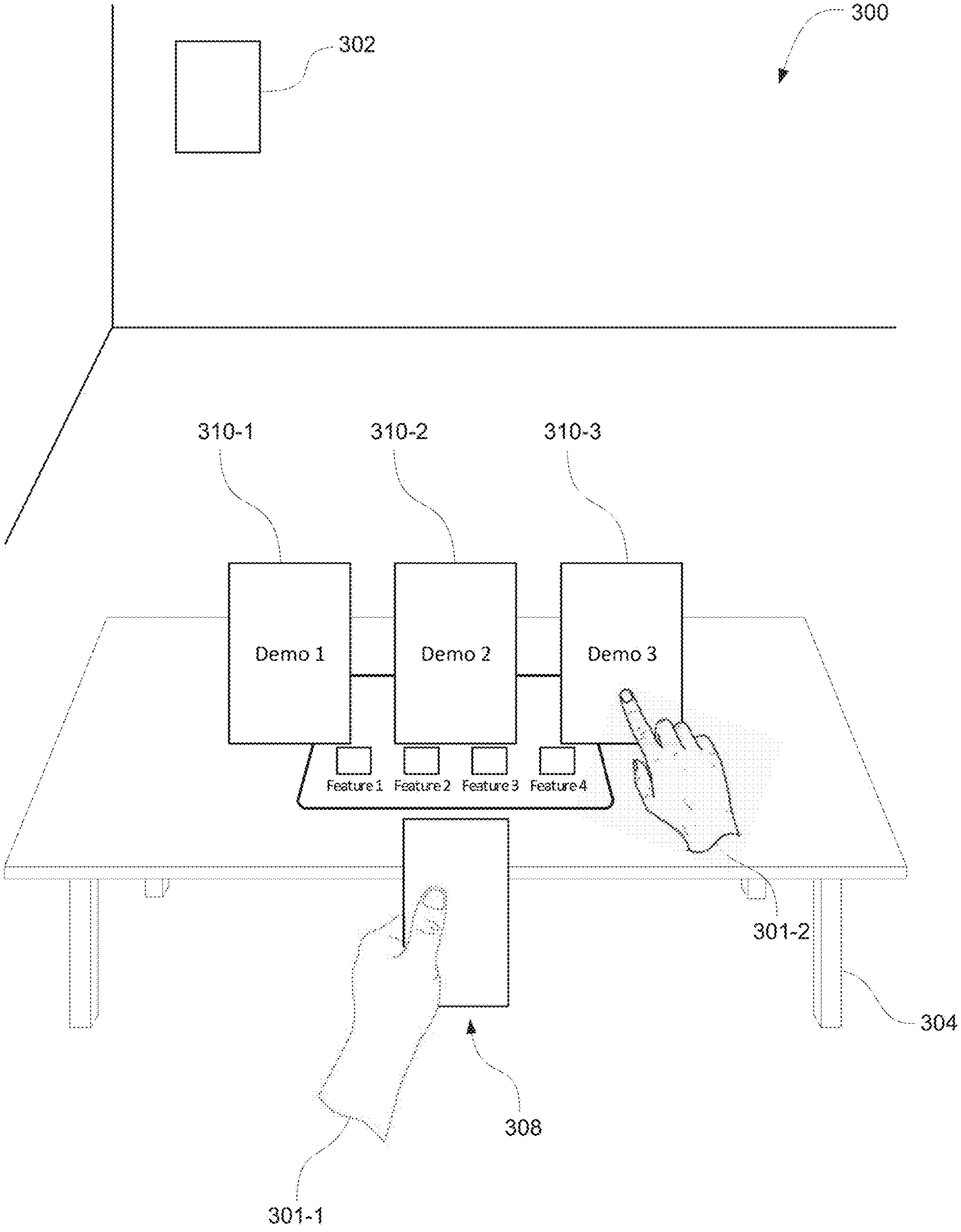

In some embodiments, in response to detecting that the user has performed a predetermined gesture and/or in response to detecting a user input corresponding to a request to display a demonstration, the system can display one or more representations of virtual content such as immersive (e.g., virtual) environments, as shown in FIG. 3B. In FIG. 3B, three-dimensional environment 300 includes representation 310-1 corresponding to a first virtual demonstration environment, representation 310-2 corresponding to a second virtual demonstration environment, and representation 310-3 corresponding to a third virtual demonstration environment. In some embodiments, representation 310-1 to 310-3 are still images representative of the associated environment, an animated graphic of the associated environment, or any other suitable representation.

As will be described in more detail below, the representations of demonstration environments are selectable to display a partial or fully immersive environment in which the user is able to interact with one or more features of the smartphone. In some embodiments, displaying a partially or fully immersive environment includes obscuring some or all of three-dimensional environment 300 (e.g., replacing the view of the physical environment), for example, to provide the user with an environment designed to demonstrate the features of the smartphone.

In FIG. 3B, the device detects a user input (e.g., a selection input) performed by hand 301-2 of the user selecting representation 310-3 corresponding to the third demonstration environment. In some embodiments, a selection input includes a pointing gesture tapping on representation 310-3 (e.g., tapping on a location in physical space that corresponds with the location of representation 310-3 in three-dimensional environment 300, or tapping on a location that is within a threshold distance from the location of representation 310-3 (e.g., a margin of error), such as 1 inch, 3 inches, 6 inches, 1 foot, 3 feet, etc.), a pinch gesture on representation 310-3, a tapping or pinching gesture while the gaze of the user is directed at representation 310-3 (e.g., optionally without requiring that hand 301-2 be within a threshold distance from representation 310-3), etc.

Figure 3C:
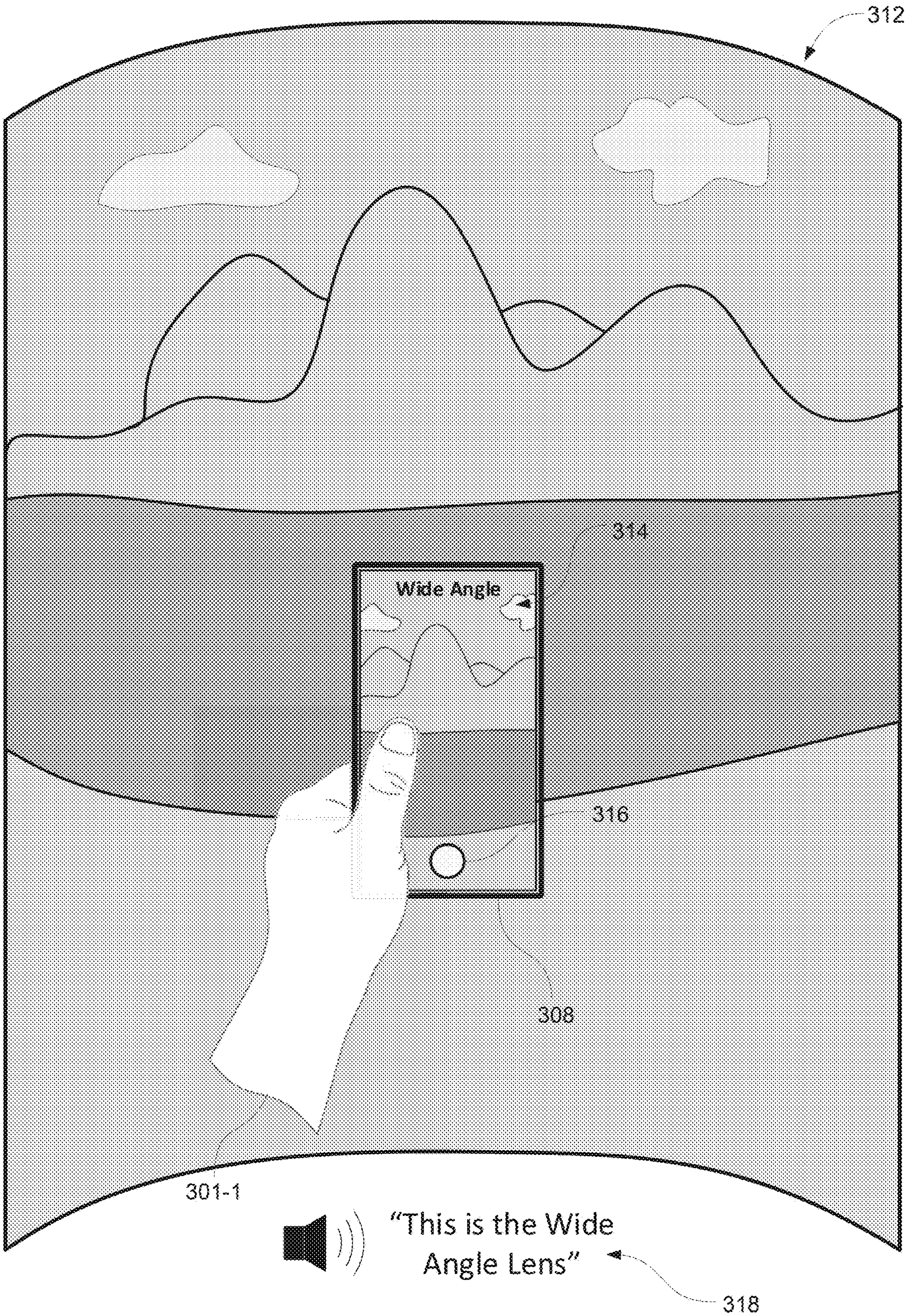

In some embodiments, in response to detecting the user input selecting representation 310-3, the device displays environment 312 associated with third demonstration environment, as shown in FIG. 3C. In some embodiments, environment 312 encompasses the entire environment generated by the device (e.g., replacing the entirety of three-dimensional environment 300 with the immersive experience such that it appears as if the user is located in environment 312 and no longer located in environment previously displayed in three-dimensional environment 300). In some embodiments, environment 312 encompasses the entire area displayed by the display generation component (e.g., the entire field of view). In some embodiments, environment 312 encompasses a subset of three-dimensional environment 300 such that a portion of three-dimensional environment 300 is still viewable. In such embodiments, environment 312 and three-dimensional environment 300 are optionally concurrently displayed (e.g., a portion of the field of view includes three-dimensional environment 300 and a portion includes environment 312). For example, a radius around the user (e.g., 1 foot, 2 feet, 3 feet, 5 feet, etc.) may still display the user's physical environment (e.g., or representations of the physical environment) such that the user is able to see his or her physical environment for safety purposes (e.g., to prevent the user from running into objects in his or her physical environment).

As shown in FIG. 3C, environment 312 is a three-dimensional simulated environment that is not necessarily based on the physical environment around the user/electronic device. For example, environment 312 illustrated in FIG. 3C is an outdoor wilderness landscape that includes a field, lake, mountains in the background, and clouds in the sky. In some embodiments, a user is able to move around in his or her physical environment and/or rotate to move around and/or rotate in environment 312. For example, a user is able to rotate towards the left, causing the device to display more of environment 312 to the left of what was previously displayed. Thus, environment 312 is displayed in a manner and reacts to the user's movements as if the user is physically located in environment 312.

In some embodiments, environment 312 continues to be displayed while hand 301-1 continues to hold representation 308 (e.g., while hand 301-1 continues to maintain a gripping posture). In some embodiments, environment 312 continues to be displayed even if hand 301-1 releases representation 308 and environment 312 is dismissed (e.g., and three-dimensional environment 300 is restored) in response to an express user input dismissing environment 312 (e.g., a user input selecting an exit affordance, etc.). In some embodiments, while displaying environment 312, the user is able to interact with representation 308 to test one or more features of the smartphone. In the embodiment illustrated in FIG. 3C, the system is demonstrating the camera features of the smartphone and thus representation 308 optionally displays camera user interface 314 that mimics the camera user interface of a camera application running on a smartphone (e.g., the real smartphone). In some embodiments, camera user interface 314 displays a preview of a scene that is being captured by the camera system of the smartphone (e.g., a viewfinder of the camera) and will be captured upon selecting shutter 316. For example, in FIG. 3C, representation 308 is held by hand 301-1 such that the camera on the back side of the smartphone is facing towards the lake and mountain scene of environment 312 and thus camera user interface 314 displays a view of the lake and mountain scene of environment 312, simulating what would be captured by the camera of a smartphone, thus providing the user with a demonstration of the camera system of the smartphone.

As shown in FIG. 3C, the camera system of the smartphone is set to the wide angle mode and thus camera user interface 314 displays a wide angle capture of environment 312 in a manner similar to the wide angle mode of the real smartphone. Thus, representation 308 provides the user with a demonstration of the wide angle mode of the camera system, such as to illustrate the camera angle, how much can be captured, the responsiveness of the system, etc. In some embodiments, the system optionally provides verbal tutorial 318 describing how to interact with representation 308, what features and/or functions are available, and what is being demonstrated. For example, in FIG. 3C, verbal tutorial 318 explains that representation 308 is currently demonstrating the wide angle lens.

Figure 3D:
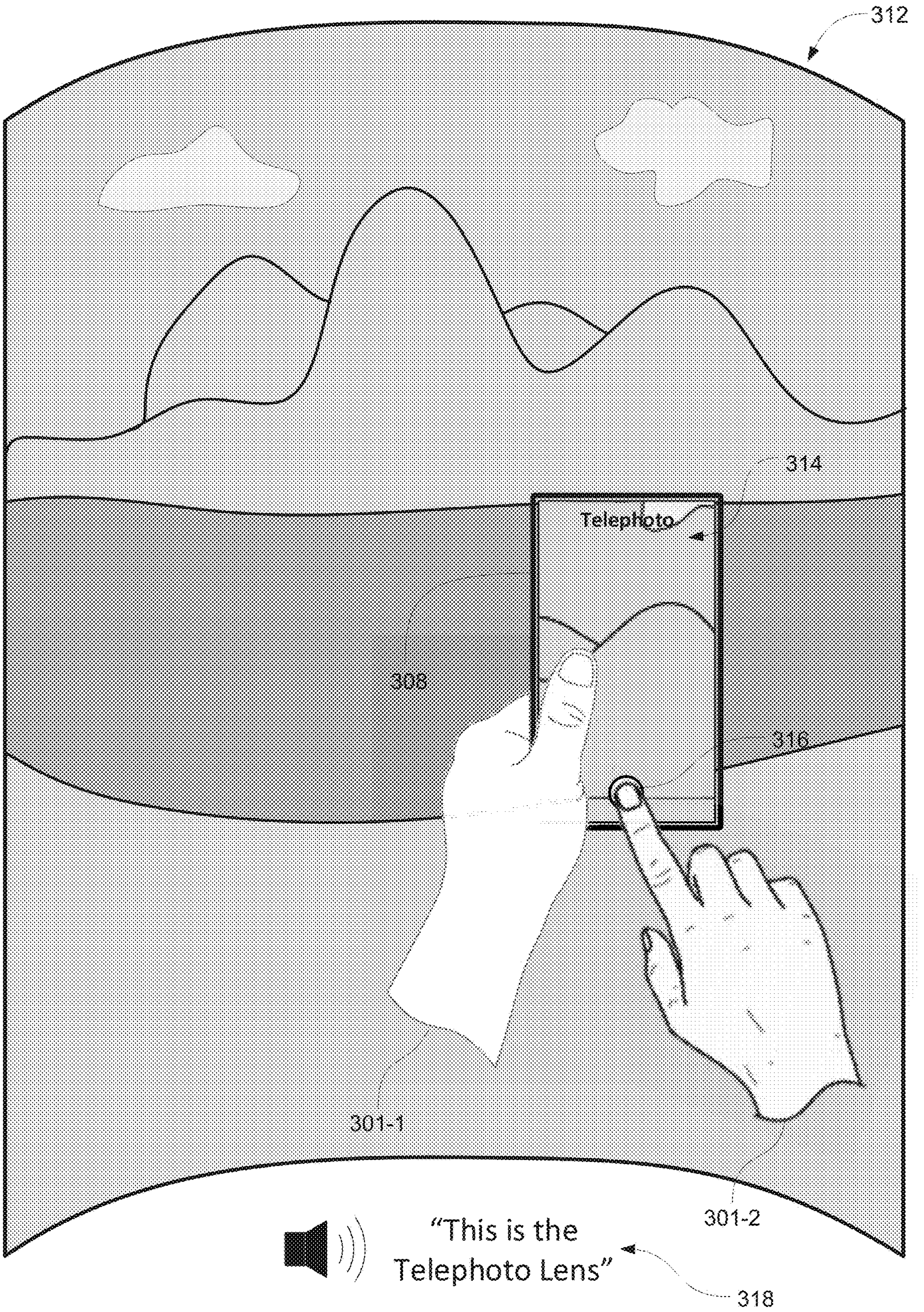

In FIG. 3D, the camera system of the smartphone is set to the telephoto mode. In some embodiments, the camera system is switched to the telephoto mode in response to a user input selecting an affordance associated with the telephoto mode. For example, camera user interface 314 optionally includes one or more buttons for switching the mode of the camera system (e.g., wide angle mode, telephoto mode, portrait mode, night mode, etc.). In some embodiments, in response to switching the camera system to telephoto mode, camera user interface 314 is updated to display a telephoto capture of environment 312 in a manner similar to the telephoto mode of the real smartphone (e.g., as if using a telephoto lens, instead of the smartphone's wide angle lens). In some embodiments, verbal tutorial 318 explains that the camera system is now operating in the telephoto lens mode.

As shown in FIG. 3D, a user is able to move representation 308 using hand 301-1 and/or change the orientation of representation 308 and cause camera user interface 314 to update based on the scene being captured by the camera system of the smartphone. For example, if the user moves representation 308 and/or rotates representation 308 to the right, camera user interface 314 is updated to display portions of environment 312 to the right of the portion that was previously displayed (e.g., the mountains on the right side of environment 312). Similarly, if the user tilts representation 308 upwards, camera user interface 314 is updated to display portions of environment 312 above the portion that was previously displayed (e.g., to include more the sky, and less of the lake, etc.). Thus, a user is able to manipulate representation 308 to change the pose of representation 308 (e.g., orientation and position) as if the user were physically manipulating a smartphone, thus causing the camera system (e.g., which is optionally located on the side of representation 308 opposite of the user) to capture different perspectives of environment 312. In this way, the user is able to demonstrate the field of view of the camera systems, how the camera systems would act in an environment such as environment 312, etc.

In some embodiments, a user is able to select shutter 316 to take a picture of environment 312 (e.g., or simulate representation 308 taking a picture of environment 312). For example, in FIG. 3D, the device detects hand 301-2 performing a selection of shutter 316 (e.g., a tap on shutter 316) and in response, representation 308 can take a picture of environment 312. In some embodiment, the picture captured of environment 312 is based on the mode of the camera system (e.g., telephoto mode in FIG. 3D) and the pose of representation 308 (e.g., the orientation of representation 308, which dictates the perspective of environment 312 that is captured by the camera system of representation 308). In some embodiments, the pictures that are taken are optionally saved to the electronic device that is displaying environment 312. In some embodiments, the user can view the photos that were taken by representation 308 for example, via a user interface for a photo application on representation 308, which optionally includes the photos that were taken with representation 308 while the device is displaying environment 312.

Thus, as described above, the system can provide a demonstration of one or more features of a respective object (such as a smartphone, in the examples described above). In some embodiments, the demonstration can include displaying an immersive environment such that the representation of the respective object can interact with the immersive environment, as described above. For example, as described above, the system can display an outdoors landscape environment, an indoor restaurant scene, a nighttime scene, etc., thus allowing the user to test the camera system in different real usage situations, including different lens modes (e.g., wide angle and telephoto). It is understood that the examples described herein can be used to demonstrate different objects not explicitly described herein. For example, the system can present a bustling coffee shop scene in which the user can test the noise cancelling features of a pair of headphones or ear buds (e.g., turning on and off noise cancelling to compare the difference and/or to test the sound pass-through features).

In some embodiments, a user can exit demonstration mode by selecting an exit affordance (e.g., an "X" or "exit" button), which causes environment 312 to cease being displayed and three-dimensional environment 300 to be re-displayed. In some embodiments, a user is able to release representation 308 (e.g., release the holding or grabbing gesture performed by hand 301-1) to exit demonstration mode and replace environment 312 with three-dimensional environment 300. In some embodiments, a user is able to lower representation 308 below a threshold height (e.g., below 0 degrees, below-45 degrees, etc.) to exit demonstration mode and replace environment 312 with three-dimensional environment 300.

Figure 4A:
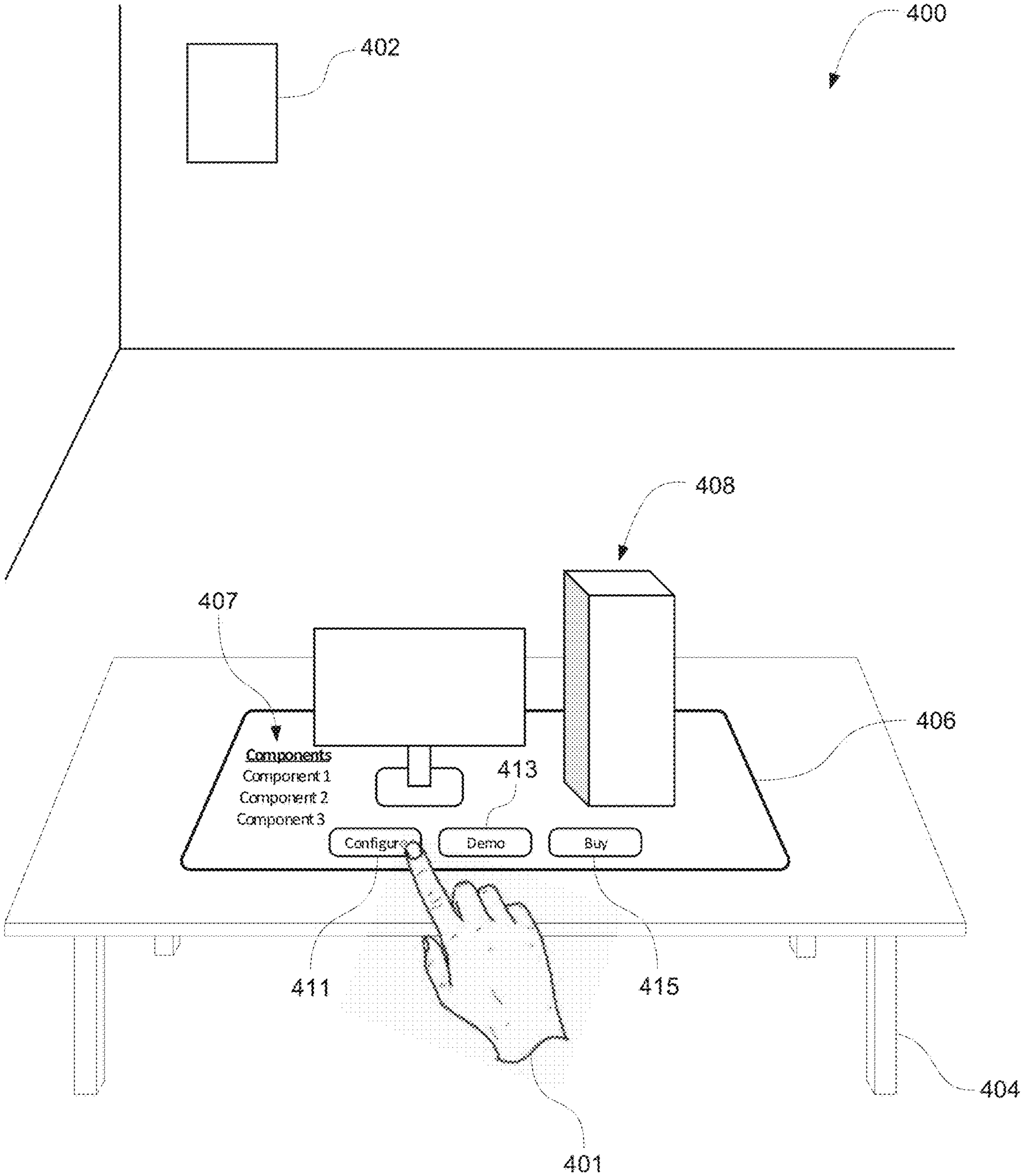
FIGS. 4A-4F illustrate a method of customizing an object (e.g., a product) and providing a demonstration of the customized object according to some embodiments of the disclosure.

FIGS. 4A-4F illustrate customizing an object (e.g., a product) and providing a demonstration of the customized object according to some embodiments of the disclosure. FIG. 4A illustrates three-dimensional environment 400 that shares similar characteristics and behaviors as three-dimensional environment 300 described above with respect to FIG. 3A, the details of which are not repeated here for brevity. In FIG. 4A, three-dimensional environment 400 includes product station 406 associated with a respective customizable product, such as a desktop computer. In some embodiments, a desktop computer product is customizable to change one or more physical components, such as the type and amount of memory, the type and amount of storage, the CPU, the GPU, the type of monitor, etc., and/or non-physical components such as services, subscriptions, software, etc. In some embodiments, changing one or more of the components optionally changes the performance of the product, for example, to make the product faster or be able to store more data. In some embodiments, a user desires to view a demonstration of the performance of the device to determine whether to select a particular component over another component. FIGS. 4A-4F provide methods in which a user is able to customize a product and view a performance demonstration based on the customization. Although FIGS. 4A-4F and the following paragraphs illustrate and describe the customization and demonstration of a physical product, in other embodiments the product being customized and demonstrated need not be physical. For example, a representation of a particular service (e.g., a cloud-based account) can be presented, and representations of optional non-physical components of that service (e.g., additional cloud storage) can be displayed along with the representation of the service. The representations of non-physical components of the service can be dragged and dropped into or out of the service to configure or customize that service.

In FIG. 4A, an object station (e.g., product station 406) includes representation 408 of a desktop computer that is available for purchase, which optionally includes a representation of a monitor and a representation of a computer tower (e.g., in which the customizable components are installed). In some embodiments, product station 406 includes component list 407 that lists the physical or non-physical components (e.g., customizable or not) that have been installed in the desktop computer. In some embodiments, component list 407 includes a subset of the components installed in the desktop computer, such as only the customizable components, only certain component types (e.g., hard-drive size, CPU, GPU, memory, software, etc.), etc. In some embodiments, component list 407 includes a full list of installed components. In some embodiments, product station 406 includes other information associated with the desktop computer, such as performance metrics, comparisons, descriptions, etc.

In some embodiments, product station 406 includes one or more affordances that are selectable to perform one or more functions associated with the desktop computer that is available for purchase. For example, in FIG. 4A, product station 406 includes configure affordance 411 that is selectable to configure the configurable aspects of the desktop computer (as will be described in further detail below), demonstration affordance 413 that is selectable to display a demonstration of the desktop computer (e.g., similar to the demonstration described above with respect to FIGS. 3A-3D and/or as will be described below), and buy affordance 415 that is selectable to initiate a process to purchase the desktop computer as currently configured (e.g., with any user customizations, if any). In some embodiments, product station 406 does not include the affordances illustrated in FIG. 4A. Product station 406 can optionally include affordances not illustrated herein, such as a share affordance that is selectable to share the desktop computer as currently configured with another user.

Figure 4B:
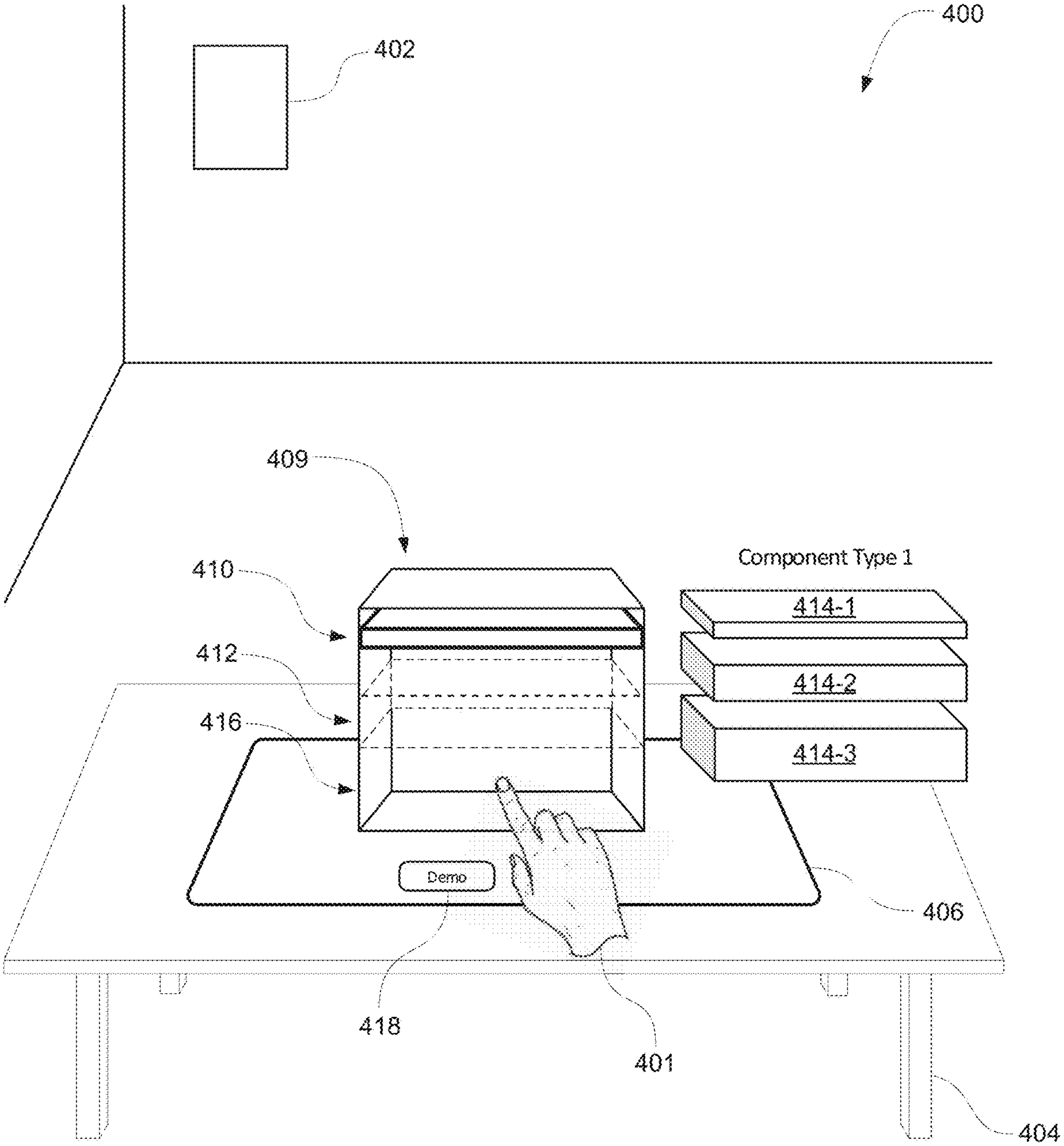

In FIG. 4A, a user input is detected from hand 401 selecting affordance 411. In some embodiments, the user input includes a gesture performed by hand 401 tapping on affordance 411 (e.g., tapping, using a finger, on a location in physical space associated with affordance 411 in virtual space, and/or tapping on a location that is within a threshold distance from affordance 411, such as 1 inch, 3 inches, 6 inches; pinching, using a thumb and forefinger, or any two fingers, on a location in physical space associated with affordance 411 in virtual space, and/or pinching on a location that is within a threshold distance from affordance 411; tapping or pinching while the gaze of the user is directed at affordance 411; or any other gesture predetermined to correspond to a selection). In some embodiments, in response to detecting a selection of affordance 411, the device initiates a process to configure the desktop computer, as shown in FIG. 4B.

In some embodiments, while in customization mode, product station 406 includes affordance 418 and affordance 420 (not shown). In some embodiments, affordance 418 is selectable to display a demonstration of the desktop computer, optionally including displaying a demonstration of the components that have been selected by the user thus far (e.g., similar to affordance 413 in FIG. 4A). In some embodiments, affordance 420 is selectable to end customization mode and return to product preview mode (e.g., as in FIG. 4A). In some embodiments, after returning to product preview mode, component list 407 is optionally updated to reflect the newly selected components. In some embodiments, other information on product station 406 are also optionally updated, such as the price, performance metrics, etc.

In some embodiments, the process to configure the desktop computer includes updating product station 406 to display the customizable portions or aspects of the desktop computer and the available components. In some embodiments, updating product station 406 includes updating representation 406 to include a representation of the tower 409, optionally opened to reveal locations at which customizable components are installed (e.g., to reveal the customizable portions of tower 409), as shown in FIG. 4B. In some embodiments, tower 409 is centered on product station 406. In some embodiments, the representation of the monitor is removed from product station 406. In some embodiments, the representation of the monitor is maintained (e.g., optionally moved to the background or to the side).

In some embodiments, customizable components of a desktop computer can be installed at a number of different predefined locations. For example, a customizable CPU can be installed in one of the one or more predefined CPU sockets on a motherboard, and a customizable GPU component can be installed in one or more predefined accessory slots on a motherboard (e.g., AGP, PCI, PCIe slots, etc.). In such embodiments, the predefined locations of tower 409 associated with the customizable components can be populated with a default component. For example, in FIG. 4B, component 410 is a representation of a component that is, by default, included in the desktop computer (e.g., a default component, which optionally can be customized to be removed or replaced with another component, etc.). In some embodiments, component 410 is optionally located in tower 409 at the location where component 410 is installed into the desktop computer. For example, component 410 is realistically located in the computer tower at the same location as if tower 409 were a real desktop computer. Thus, in some embodiments, different locations of tower 409 can be associated with different potential customizable components. For example, a PCIe port can be compatible with sound cards, graphics cards, modems, etc. because these components can be installed into a PCIe port, but the PCIe port is not compatible with a CPU component. In some embodiments, a user can select a particular location in tower 409 and in response, the user is presented with a plurality of customizable components that are compatible with the respective location, which are optionally selectable to select the respective component for installation into the desktop computer (e.g., and optionally not presented with components that are not compatible with the respective location).

For example, in FIG. 4B, location 412, location 416, and the location in which component 410 is installed are selectable to customize and/or select the components to install at the respective locations. In FIG. 4B, location 412 is currently selected for customization and is thus visually emphasized, as shown by the dotted lines. In some embodiments, an indication of the currently selected component can include highlighting, outlining, or any other suitable type of visual enhancement. In some embodiments, because location 412 is currently selected for customization, one or more representations of compatible physical or non-physical components for location 412 are displayed in three-dimensional environment 400, optionally floating in space near tower 409. In FIG. 4B, three-dimensional environment 400 includes representation 414-1 corresponding to a first component, representation 414-2 corresponding to a second component, and representation 414-3 corresponding to a third component. As shown in FIG. 4B, representations 414-1, 414-2, and 414-3 are optionally displayed under a header indicating the type of component that can be installed in location 412 (e.g., optionally because location 412 can only accept one type of component). In some embodiments, the first, second, and third components are all components of a first component type (e.g., all GPUs, all CPUs, etc.), optionally because location 412 is only compatible with the first component type (e.g., only accepts GPUs, only accepts GPUs, etc.). For example, the first component can be a budget level component of component type 1, the second component can be an enthusiast level component of component type 1, and the third component can be a professional level component of component type 1. In some embodiments, three-dimensional environment 400 includes a plurality of headers of a plurality of component types if, for example, location 412 can accept multiple component types. As shown in FIG. 4B, representations 414-1, 414-2, and 414-3 are floating in space near tower 409 and are three-dimensional models of their respective component (e.g., photorealistic representations of the respective component, a symbolic representation of the respective component, a caricature of the respective component, etc.). In some embodiments, representation 414-2, 414-2, and 414-3 have a size and shape based on the size and shape of the respective component of which it is a representation (e.g., a realistic size, etc.). In some embodiments, representations 414-1, 414-2, and 414-3 are selectable and/or manipulable to install the respective component into the desktop computer at location 412, such that the respective component is included in the purchase of the desktop computer (e.g., bundled and/or installed with the desktop computer), as will be described in further detail below. Additionally, in some embodiments representations of non-physical components (e.g., services, subscriptions, software, etc.) can also appear near tower 409. These non-physical representations can also be selectable and/or manipulable to be installed into the desktop computer at appropriate locations, such that the respective non-physical component is included in the purchase of the desktop computer.

In FIG. 4B, the electronic device detects a gesture performed by hand 401 corresponding to a selection of location 416. In some embodiments, a selection gesture includes a pointing gesture by hand 401 touching a location corresponding to location 416 (e.g., reaching a location in physical space that maps to the location in three-dimensional environment 400 associated with location 416) or touching a location that is within a threshold distance from location 416 (e.g., a margin of error distance such as 1 inch, 3 inch, 6 inches, etc.). In some embodiments, a selection gesture includes a pointing gesture while the gaze of the user is directed at location 416. In some embodiments, other types of gestures predetermined to correspond to a selection input are possible. In some embodiments, as described above, location 416 corresponds to a location in which customizable components can be installed. In some embodiments, a user is able to select a location in which a component has already been installed (e.g., such as the location associated with component 410) or a location in which no components have yet been installed (e.g., such as location 416). In some embodiments, in response to the selection input, location 416 can optionally be visually highlighted (e.g., outlined, highlighted, etc.) to indicate that location 416 has been selected for customization, as shown in FIG. 4C.

In some embodiments, available locations for customization can be visually indicated. For example, while hand 401 is approaching location 416 but before hand 401 has selected location 416 (e.g., while hand 401 is pointing at location 416 but before hand 401 is within the threshold distance at which location 416 is selected by hand 401) or while gaze is directed to location 416, location 416 can be visually highlighted to indicate that location 416 is selectable (e.g., that location 416 is a customizable location). In some embodiments, the indication that location 416 is selectable is a different visual indication than the indication that location 416 has been selected for customization. For example, the indication that location 416 is selectable can be a lighter highlighting while the indication that location 416 has been selected is a bolder highlighting.

Figure 4C:
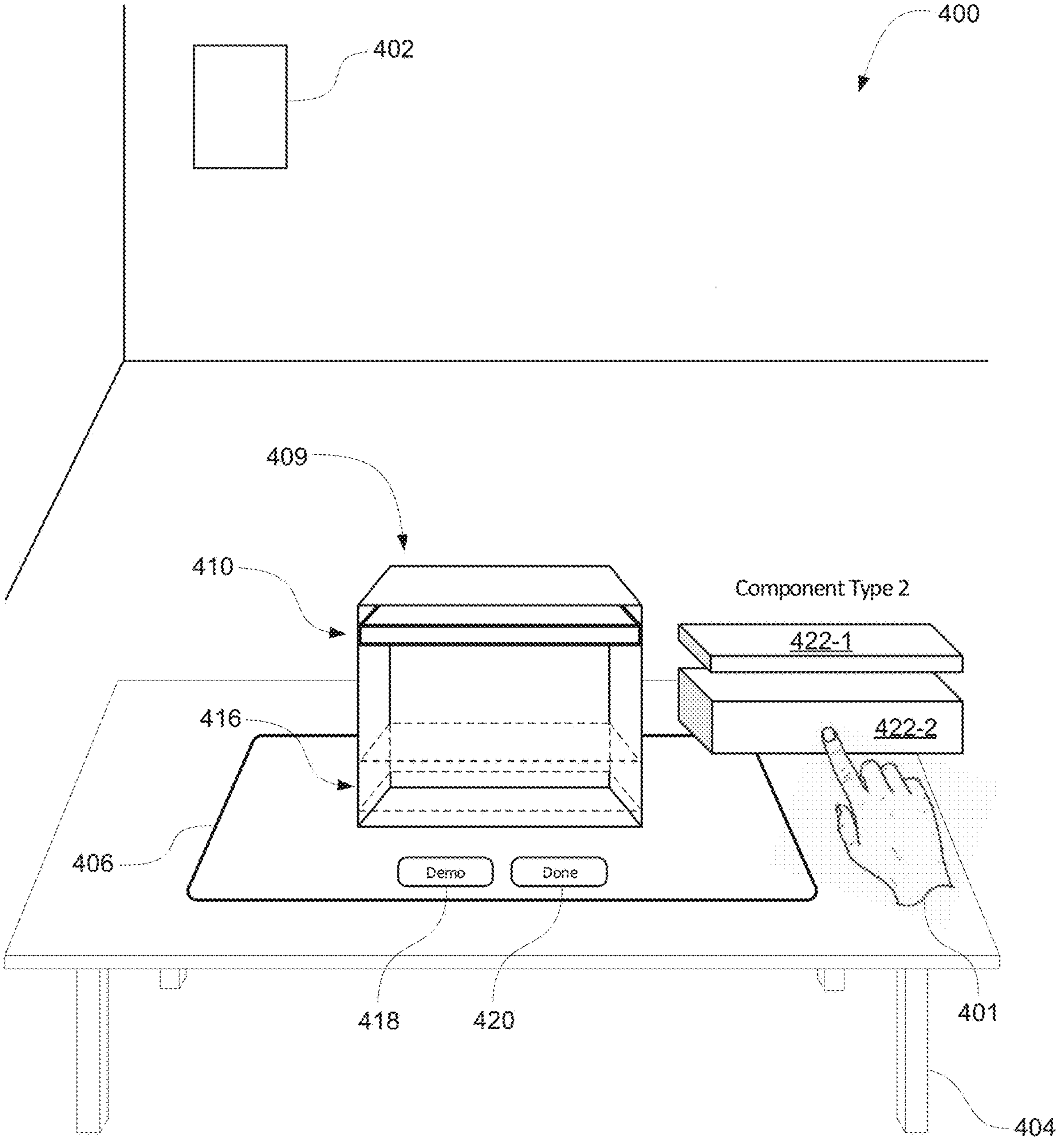

In FIG. 4C, in response to the selection input selecting location 416, location 416 is visually highlighted to indicate that location 416 is selected for customization and location 412 is no longer visually highlighted. In some embodiments, representations 414-1, 414-2, and 414-3 corresponding to location 412 are replaced with representation 422-1 and representation 422-2 corresponding to components available for location 416. In some embodiments, representation 422-1 and representation 422-2 correspond to a first component and second component, respectively, of a second component type that is compatible with location 416. For example, location 416 is compatible with components of the second component type, but not components of the first component type, and thus representations of components of the second component type that can be installed in location 416 are displayed and representations of components that cannot be installed in location are not displayed (e.g., components of the first component type). As discussed above, if location 416 is compatible with components of a plurality of component types, then representations of components of the plurality of component types can be displayed. In some embodiments, multiple component types can be displayed at visually separate areas or under separate component type headers.

In FIG. 4C, the electronic device detects that hand 401 has selected representation 422-2 corresponding to the second component of the second component type. In some embodiments, a selection of representation 422-2 includes a pointing gesture performed by a finger of hand 401 touching representation 422-2 (e.g., touching a location in physical space that maps to the location of representation 422-2 in three-dimensional environment 400). In some embodiments, a selection input can be a pinch gesture performed by hand 401 pinching on representation 422-2 (e.g., a direct manipulation input). In some embodiments, a selection input can be a pointing or pinching gesture while the gaze of the user is directed at representation 422-2 (e.g., an indirect manipulation input, for example, while the user is looking at representation 422-2, optionally without regard to whether hand 401 is touching representation 422-2).

Figure 4D:
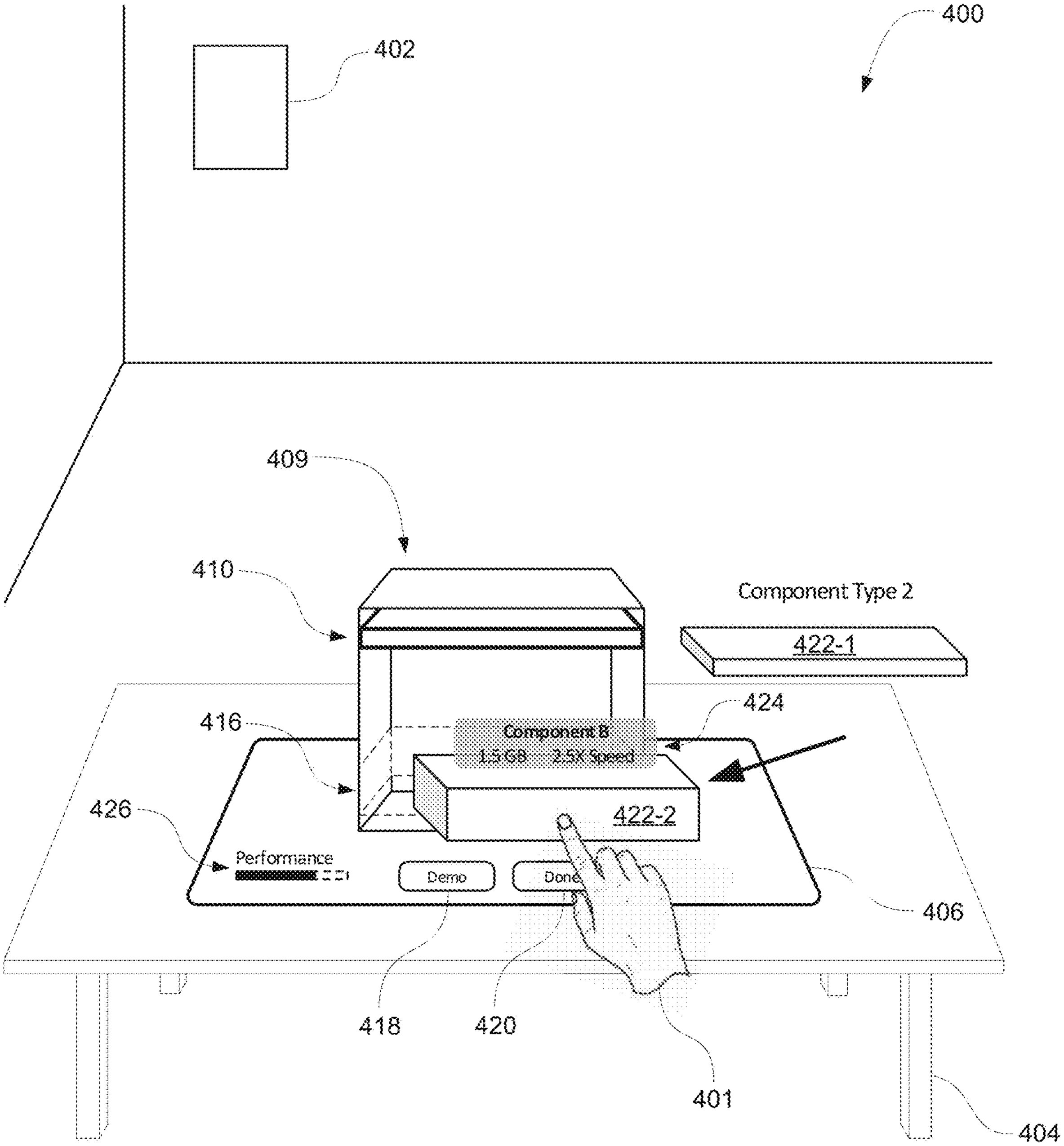

In FIG. 4D, while maintaining the selection input (e.g., while maintaining the pointing gesture or while maintaining the pinch gesture by hand 401), the electronic device detects that hand 401 has moved towards location 416. In some embodiments, in response to detecting that hand 401 has moved while maintaining the selection input, representation 422-2 moves in accordance with the movement of the hand 401. For example, representation 422-2 moves with hand 401 such that it appears as if hand 401 is holding representation 422-2 (e.g., if the input was a direct manipulation input, for example, as if representation 422-2 is attached to the finger of hand 401 or as if hand 401 is pinching representation 422-2). In some embodiments, if hand 401 was not contacting representation 422-2 when the selection input began (e.g., if the selection input is not a direct manipulation input), then representation 422-2 moves in the same direction as the movement of hand 401 and by a magnitude that is based on (e.g., equal to or proportional to) the movement of hand 401.

As shown in FIG. 4D, in response to detecting the selection input (e.g., with or without detecting the movement of hand 401 and while maintaining the selection input), the electronic device optionally displays information 424 associated with component 422-2. In some embodiments, information 424 includes descriptive text describing component 422-2, specifications of component 422-2, performance metrics of component 422-2, or any other information associated with component 422-2. For example, in FIG. 4D, information 424 includes the name of component 422-2 (e.g., "Component B"), the memory size of component 422-2 (e.g., "1.5 GB" if, for example, component 422-2 has or is a memory component), and a predicted performance improvement (e.g., 2.5× speed improvement). In some embodiments, information 424 is displayed near representation 422-2 (e.g., floating in space above representation 422-2, in front of representation 422-2, to the left or right of representation 422-2, etc.). In some embodiments, if representation 422-2 moves in three-dimensional environment 400 (e.g., in response to a user input moving representation 422-2), information 424 optionally moves accordingly to match the movement of representation 422-2 and maintain the same relative position with respect to representation 422-2. In some embodiments, information 424 is transparent and/or translucent such that objects of three-dimensional environment 400 are at least partially visible through information 424. In some embodiments, while detecting the selection input, product station 406 optionally includes comparison 426. Comparison 426 optionally includes text and/or graphics comparing one or more metrics of the desktop computer without the selected component to the respective metrics of the desktop computer with the selected component. For example, a comparison of a selected GPU component could include an indication of the change in the number of teraflops of graphical processing power, the change in the number of processing cores, and/or the change in the amount of memory, etc. In some embodiments, if a component is already installed into location 416, comparison 426 includes a comparison of the one or more metrics of the desktop computer with the currently installed component against the one or more metrics of the desktop computer with the component associated with representation 422-2. In some embodiments, product station 406 can include other comparison information while representation 422-2 is selected, such as an indication of one or more components that will be removed and one or more components that will be added if the component associated with representation 422-2 is selected for location 416 (e.g., by dragging representation 422-2 into location 416, as will be described in further detail below).

In some embodiments, when representation 422-2 approaches to within a threshold distance from location 416 (e.g., 1 inch, 3 inches, 6 inches, 12 inches, etc.), location 416 optionally changes one or more visual characteristics to indicate that representation 422-2 is within "snap" range (e.g., the threshold distance) of location 416. In some embodiments, the "snap" range is the range within which representation 422-2 will snap into location 416 in response to detecting the termination of the selection input. For example, in response to detecting the termination of the pointing gesture (e.g., the withdrawal of the pointing finger) or in response to detecting the termination of the pinch gesture (e.g., the releasing of the pinch), if representation 422-2 is within the snap range, then representation 422-2 snaps to location 416 (e.g., is displayed at location 416, optionally with an animation of representation 422-2 moving to location 416), as shown in FIG. 4E.

Figure 4E:
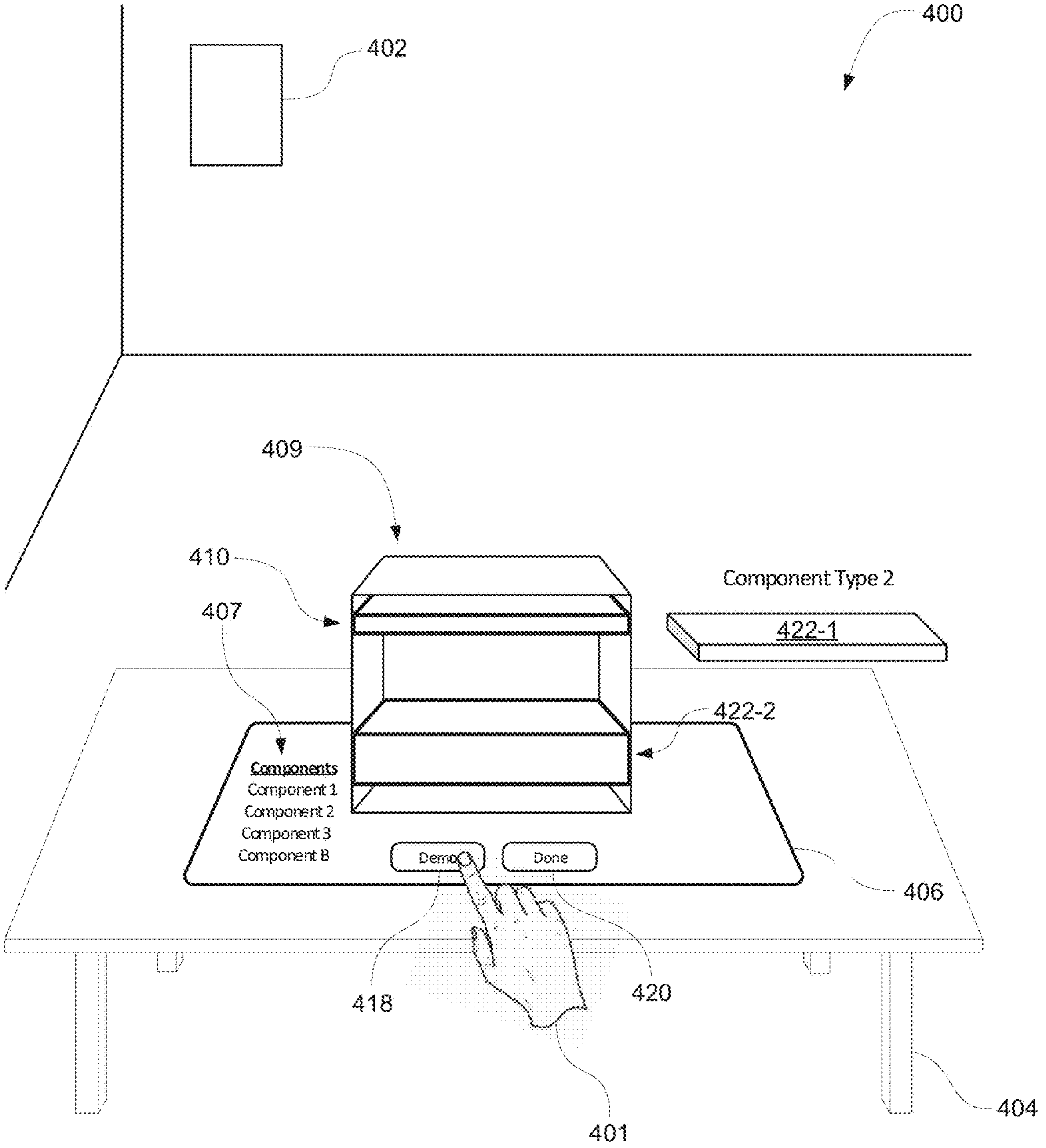

In FIG. 4E, after detecting the termination of the selection input, representation 422-2 is installed into location 416 and displayed at location 416, thus configuring the component associated with representation 422-2 as an included component for the desktop computer product (e.g., purchasing the product as currently shown will include the component associated with representation 422-2), optionally replacing any components that were previously installed into location 416.

In some embodiments, in response to selecting the component associated with representation 422-2, the device updates component list 407 to include the component associated with representation 422-2 (e.g., Component B) to indicate that the component associated with representation 422-2 has been installed into the desktop computer and will be included in the purchase of the desktop computer. In some embodiments, component list 407 is not displayed while configuring the desktop computer (e.g., while selecting components) is displayed in response to the selection of a component (e.g., optionally only for a threshold amount of time such as 1 second, 3 seconds, 5 seconds, 10 seconds, etc.). In some embodiments, component list 407 appears with the selected component (e.g., and optionally with any replaced or removed components removed from component list 407). In some embodiments, component list 407 appears when a component is removed from the desktop computer and/or when a component replaces an installed component (e.g., any time component list 407 changes, optionally only for a threshold amount of time such as 1 second, 3 seconds, 5 seconds, 10 seconds, etc.). In some embodiments, component list 407 is continually displayed while the desktop computer is being configured (e.g., optionally dimmed, greyed out, or otherwise visually de-emphasized) and updated in response to added or removed components.

In some embodiments, after installing the component associated with representation 422-2, location 416 optionally remains selected for configuration and thus three-dimensional environment 400 continues to include the one or more representations of components available for location 416. As shown in FIG. 4E, representation 422-1 continues to be displayed indicating that representation 422-1 can be selected for installation into location 416 (e.g., thus replacing the component previously selected). However, representation 422-2 is no longer displayed with the list of representations (e.g., under the Component Type 2 header) as an available option because the component associated with representation 422-2 is already selected and installed into location 416.

Similarly to location 416 in FIG. 4B, a user is able to select locations for customization within which a component is already installed (e.g., a location that is already occupied by an installed component). In some embodiments, selecting a location that is already occupied by a component causes display of available components for the respective location, which are selectable to replace the currently selected component with the selected component. For example, a user is able to select component 410 to cause the display of one or more representations of components (e.g., in a manner similar to representations 422-1 and 422-2 in FIG. 4D and representations 414-1 to 414-3 in FIG. 4B) that are compatible with the location currently occupied by component 410. In some embodiments, the displayed representations are selectable (e.g., can be dragged and dropped into the location occupied by component 410), to replace component 410 with the selected component.

In some embodiments, an installed component can be removed from the desktop computer by dragging and dropping the component out of the desktop computer. For example, a user is able to interact with component 410 to remove component 410 from the location currently occupied by component 410. In some embodiments, removing component 410 causes component 410 to be removed from the desktop computer (e.g., component 410 is no longer included in the desktop computer for purchase). In some embodiments, a user is able to perform a selection gesture on component 410 (e.g., a pinch or pointing gesture directed at component 410) with a hand (e.g., such as hand 401), and while maintaining the selection gesture, move hand 410 away from the location currently occupied by component 410 by more than a threshold amount (e.g., 1 inch, 3 inches, 6 inches, 12 inches, etc.) to cause component 410 to be removed from representation 408 (e.g., remove component 410 from the location previously occupied by component 410 and/or remove component 410 from the desktop computer). In some embodiments, upon release of the selection gesture, component 410 is no longer displayed in tower 409 and the desktop computer is updated to no longer include component 410 (e.g., if the user were to purchase the desktop computer at this time or complete the customization process, component 410 would not be included in the purchase and no components would be installed in the respective location). In some embodiments, removing component 410 causes the location associated with component 410 to be selected for customization and causes one or more representations of components for the respective location to be displayed (e.g., in a manner similar to representations 414-1 to 414-3). In some embodiments, removing component 410 optionally causes component 410 to be displayed in the array of available components. For example, after removing component 410, component 410 is displayed with the one or more representations of components and can be selected to re-install component 410 into the respective location.

In FIG. 4E, while the product is still in customization mode, a user input such as selection of affordance 418 by hand 401 is detected. As discussed above, affordance 418 is selectable to initiate a process to demonstrate the features of the respective product (e.g., the desktop computer). In some embodiments, the demonstration includes a demonstration of one or more featured components of the product (e.g., a component that was selected by the user if the user changed one or more of the default components to a custom component, or a default component of the product). In some embodiments, different demonstrations can be provided based on the components that were selected. For example, if a first component is installed in the desktop computer, the demonstration can be a demonstration of the first component, but if a second component were installed in the computer instead of the first component, the demonstration can be a demonstration of the second component. In some embodiments, the user is able to provide a selection input to select which demonstration (e.g., which virtual content such a software application running on the virtual product or computer) to view if, for example, multiple demonstrations are available.

Figure 4F:
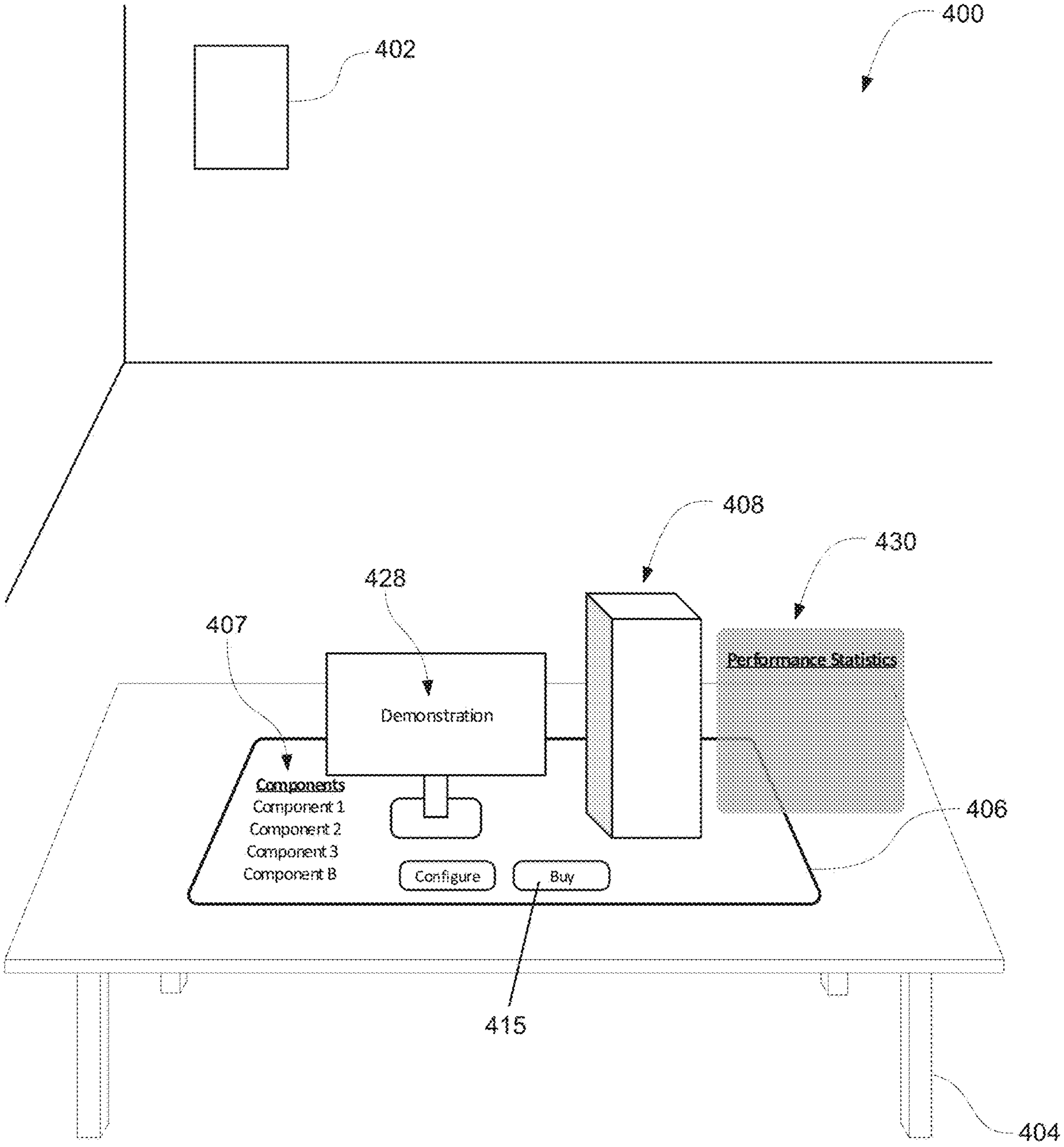

In response to selection of affordance 418, the product optionally exits customization mode and enters into demonstration mode, as shown in FIG. 4F. In some embodiments, demonstration mode includes displaying the product in its product preview mode, such as in FIG. 4A. For example, in FIG. 4F, product station 406 includes representation 408 which includes a representation of a monitor and a representation of a computer tower (e.g., the desktop computer product includes a monitor and a computer tower or the desktop computer product includes just the computer tower) displayed side-by-side. In some embodiments, product station 406 includes component list 407 that lists one or more featured components that have been installed into the computer tower (e.g., components that have been installed into the product, including the components that were selected during customization mode).

As shown in FIG. 4F, demonstration mode can include displaying demonstration 428 on the representation of the monitor (e.g., as if the monitor is connected to the desktop computer, turned on, and displaying one or more programs that are running on the desktop computer). In some embodiments, demonstration 428 can include one or more graphics, animations, videos, or other types of demonstrative. For example, if Component B has been installed in the desktop computer (e.g., as in FIG. 4F), then demonstration 428 can include displaying a program performing one or more tasks that utilize Component B. In some embodiments, demonstration 428 can indicate or otherwise demonstrate that the one or more tasks are being performed faster or better as a result of purchasing and installing Component B into the desktop computer (e.g., as opposed to not selecting Component B, or selecting another component instead of Component B).

In some embodiments, demonstration mode can include displaying one or more informational elements on product station 406 or in three-dimensional environment 400, such as performance information 430. In some embodiments, performance information 430 is a virtual object displayed in three-dimensional environment 400 (e.g., on product station 406, floating in space, attached to a surface, etc.). In some embodiments, performance information 430 is a planar surface on which information and/or graphics can be displayed (e.g., such as a whiteboard, a presentation board, etc.). In some embodiments, performance information 430 includes performance statistics and/or metrics of the desktop computer including statistics and metrics improvement due to one or more selected components. In some embodiments, performance information 430 can include textual information, for example, indicating the speed for performing certain tasks (e.g., how much faster the computer performs due to certain selected components), the amount of computing bandwidth that is available, the clock speed of the processor, etc.

In some embodiments, the above-described demonstration mode can be initiated while not in customization mode. For example, while in product preview mode, such as in FIG. 4A, a user is able to select affordance 414 to initiate demonstration mode. In some embodiments, if demonstration mode is initiated without customizing any components, the provided demonstration can be for the overall product or can be for a component that is included in the product (e.g., without customization). In some embodiments, if demonstration mode is initiated while in product preview mode, after the user has performed one or more customizations, the demonstration can be of one of the components selected during customization mode (e.g., as described above), or can be a demonstration for the overall product, or a component that is included in the product by default (e.g., a component that is installed in the product, but wasn't one that was selected by the user during customization mode).

In some embodiments, after completing customization, a user is able to select buy affordance 415 to initiate a process to purchase the desktop computer. In some embodiments, the desktop computer has been customized with the components selected by the user such that desktop computer to be purchased includes all the components that were selected during customization mode (e.g., and does not include the components that were removed during customization mode). In some embodiments, the price of the desktop computer reflects the customizations selected during customization mode.

Figure 5:
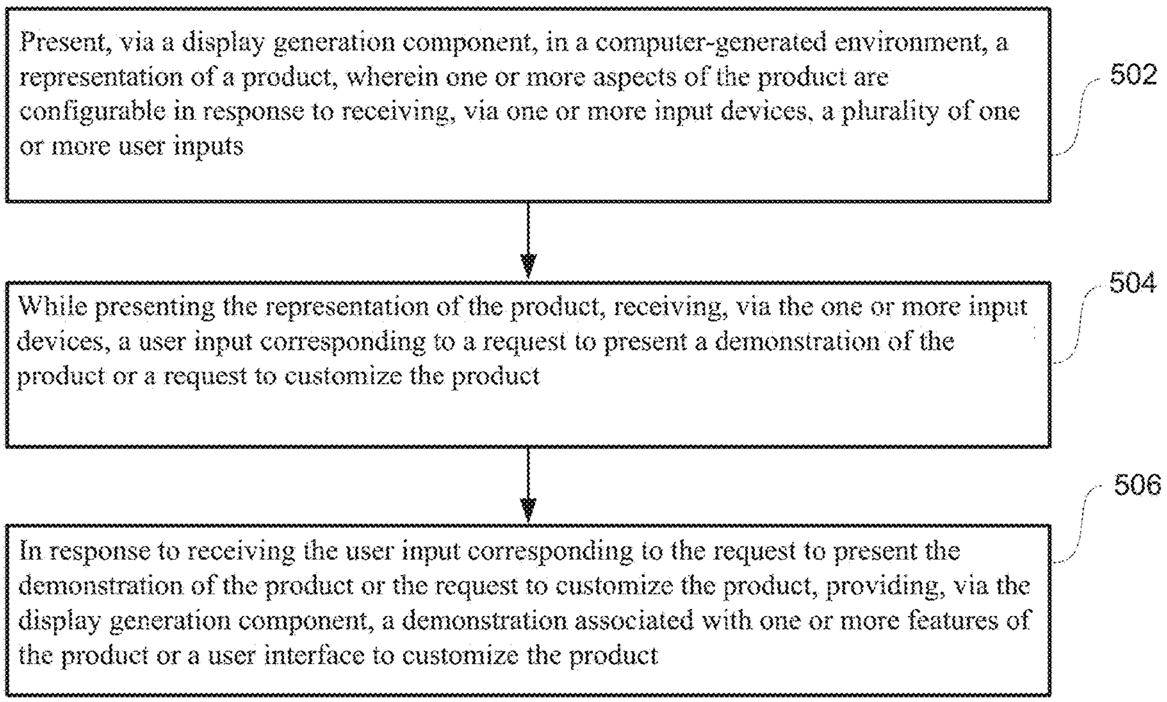
FIG. 5 is a flow diagram illustrating a method of demonstrating features of an object (e.g., a product) in a three-dimensional environment according to some embodiments of the disclosure.

FIG. 5 is a flow diagram illustrating a method 500 of demonstrating features of an object (e.g., a product) in a three-dimensional environment according to some embodiments of the disclosure. The method 500 is optionally performed at an electronic device such as device 100 and device 200, when displaying products in a virtual retail store described above with reference to FIGS. 3A-3D and 4A-4F. Some operations in method 500 are, optionally combined and/or order of some operations is, optionally, changed. As described below, the method 500 provides methods of demonstrating features of a product in a three-dimensional environment in accordance with embodiments of the disclosure (e.g., as discussed above with respect to FIGS. 3A-3D and 4A-4F). At 502, the method includes presenting, via a display generation component in a computer-generated environment, a representation of a product, wherein one or more aspects of the product are configurable in response to receiving, via one or more input devices, a plurality of one or more user inputs. At 504, the method includes, while presenting the representation of the product, receiving, via the one or more input devices, a user input corresponding to a request to present a demonstration of the product or a request to customize the product. At 506, the method includes, in response to receiving the user input corresponding to the request to present the demonstration of the product or the request to customize the product, providing, via the display generation component, a demonstration associated with one or more features of the product or a user interface to customize the product.

Therefore, according to the above, some examples of the disclosure are directed to a method, comprising, at an electronic device in communication with a display and one or more input devices, presenting, via the display, in a computer-generated environment, a representation of an object, wherein one or more aspects of the object are configurable in response to receiving, via the one or more input devices, one or more user inputs, while presenting the representation of the object, receiving, via the one or more input devices, a user input corresponding to a request to present a demonstration of the object and a selection input directed to virtual content, and in response to receiving the user input corresponding to the request to present the demonstration of the object, providing, via the display, a demonstration associated with one or more features of the object in association with the virtual content. Alternatively or additionally to one or more of the examples disclosed above, in some examples the method further comprises displaying one or more representations of one or more virtual environments that are selectable to display the respective virtual environment in the computer-generated environment, wherein the selection input directed to virtual content comprises a selection input directed to a first representation of the one or more representations associated with a first virtual environment, and wherein providing the demonstration associated with one or more features of the object in association with the virtual content includes updating the computer-generated environment to include the first virtual environment. Alternatively or additionally to one or more of the examples disclosed above, in some examples the method further comprises, while displaying the first virtual environment, displaying a first representation of a first hand of the user and the representation of the object at a location associated with the first representation of the first hand, detecting, via the one or more input devices, a respective user input, in accordance with a determination that the respective user input includes a movement of the first hand of the user, moving the representation of the first hand of the user in accordance with the movement of the first hand of the user, and moving the representation of the object in accordance with the movement of the representation of the first hand of the user, and in accordance with a determination that the respective user input includes a user input directed to the representation of the object corresponding to a request to perform a first operation associated with the object, performing the first operation. Alternatively or additionally to one or more of the examples disclosed above, in some examples the object includes one or more cameras, and the representation of the object includes a representation of a display, the method further comprising detecting a user input directed to an affordance displayed on the representation of the display corresponding to a request to take a picture using the one or more cameras of the object, and in response to detecting the user input directed to the affordance, displaying a simulation of the representation of the object taking a picture of a respective portion of the first virtual environment. Alternatively or additionally to one or more of the examples disclosed above, in some examples the object includes one or more cameras, and the representation of the object includes a representation of a display, the method further comprising displaying, on the representation of the display, a first portion of the first virtual environment captured by the one or more cameras of the representation of the object, and in response to detecting the movement of the first hand of the user, replacing display of the first portion of the first virtual environment with display of a second portion of the first virtual environment captured by the one or more cameras of the representation of the object in accordance with the movement of the representation of the object. Alternatively or additionally to one or more of the examples disclosed above, in some examples performing the first operation includes changing a camera mode of the representation of the object. Alternatively or additionally to one or more of the examples disclosed above, in some examples the method further comprises providing the demonstration associated with one or more features of the object includes providing an audible tutorial of the one or more features of the object. Alternatively or additionally to one or more of the examples disclosed above, in some examples providing the demonstration associated with the one or more features of the object includes providing a demonstration associated with the one or more configurable aspects of the object. Alternatively or additionally to one or more of the examples disclosed above, in some examples the method further comprises initiating a process to configure the one or more aspects of the object. Alternatively or additionally to one or more of the examples disclosed above, in some examples the process to configure the one or more aspects of the object includes displaying one or more representations of a first set of components compatible with a first aspect of the object, the method further comprising detecting, via the one or more input devices, a plurality of user inputs including a selection input performed by a hand of the user directed to a first representation of the one or more representations of the first set of components associated with a first part and a movement of the hand of the user while maintaining the selection input to a location on the representation of the object associated with the first aspect of the object, and in response to detecting the plurality of user inputs, configuring the first aspect of the object with the first part. Alternatively or additionally to one or more of the examples disclosed above, in some examples the method further comprises, during the process to configure the one or more aspects of the object, detecting, via the one or more input devices, a selection input performed by a hand of the user directed to a respective location on the representation of the object associated with a respective aspect of the object, and in response to detecting the selection input directed to the respective location on the representation of the object associated with the respective aspect of the object, displaying one or more representations of a respective set of components compatible with the respective aspect of the object. Alternatively or additionally to one or more of the examples disclosed above, in some examples the method further comprises, during the process to configure the one or more aspects of the object, detecting, via the one or more input devices, a plurality of inputs including a selection input performed by a hand of the user directed to a respective component located at a respective location on the representation of the object associated with the first aspect of the object and a movement of the hand of the user, while maintaining the selection input, away from the respective location by more than a threshold amount, and in response to detecting the plurality of inputs, configuring the first aspect of the object without the respective component. Alternatively or additionally to one or more of the examples disclosed above, in some examples the method further comprises, while detecting the selection input performed by the hand of the user directed to a respective representation of a respective component, displaying information associated with the respective component. Alternatively or additionally to one or more of the examples disclosed above, in some examples the information associated with the respective component includes a graphical indication of a change in one or more metrics of the object if the object were configured with the respective component. Alternatively or additionally to one or more of the examples disclosed above, in some examples providing the demonstration associated with one or more features of the object includes, after initiating the process to configure the one or more aspects of the object, in accordance with a determination that the object has been configured with a first component, providing a first demonstration of the object associated with the first component, and in accordance with a determination that the object has not been configured with the first component, forgoing providing the first demonstration associated with the first component. Alternatively or additionally to one or more of the examples disclosed above, in some examples providing the demonstration associated with one or more features of the object includes, after initiating the process to configure the one or more aspects of the object, in accordance with a determination that the object has not been configured with the first component and the object has been configured with the second component, providing a second demonstration of the object associated with the second component, different from the first demonstration. Alternatively or additionally to one or more of the examples disclosed above, in some examples the method further comprises, after initiating the process to configure the one or more aspects of the object, detecting, via the one or more input devices, a selection input directed to a purchase affordance associated with the object, and in response to detecting the selection input, initiating a process to purchase the object including one or more components configured during the process to configure the one or more aspects of the object. Alternatively or additionally to one or more of the examples disclosed above, in some examples the representation of the object includes a representation of a display screen, the selection input directed to virtual content comprises a selection input directed a software application running on the representation of the display screen, and providing the demonstration associated with one or more features of the object in association with the virtual content includes displaying, on the representation of the display screen, a simulation of an application running on the object. Alternatively or additionally to one or more of the examples disclosed above, in some examples the first set of components includes one or more physical components and one or more non-physical components.

Some examples of the disclosure are directed to an electronic device, comprising one or more processors, memory, and one or more programs, wherein the one or more programs are stored in the memory and configured to be executed by the one or more processors, the one or more programs including instructions for presenting, via a display, in a computer-generated environment, a representation of an object, wherein one or more aspects of the object are configurable in response to receiving, via one or more input devices, one or more user inputs, while presenting the representation of the object, receiving, via the one or more input devices, a user input corresponding to a request to present a demonstration of the object and a selection input directed to virtual content, and in response to receiving the user input corresponding to the request to present the demonstration of the object, providing, via the display, a demonstration associated with one or more features of the object in association with the virtual content.

Some examples of the disclosure are directed to a non-transitory computer readable storage medium storing one or more programs, the one or more programs comprising instructions, which when executed by one or more processors of an electronic device, cause the electronic device to present, via a display, in a computer-generated environment, a representation of an object, wherein one or more aspects of the object are configurable in response to receiving, via one or more input devices, one or more user inputs, while presenting the representation of the object, receive, via the one or more input devices, a user input corresponding to a request to present a demonstration of the object and a selection input directed to virtual content, and in response to receiving the user input corresponding to the request to present the demonstration of the object, providing, via the display, a demonstration associated with one or more features of the object in association with the virtual content.

Some examples of the disclosure are directed to an electronic device, comprising one or more processors, memory, one or more programs, wherein the one or more programs are stored in the memory and configured to be executed by the one or more processors, the one or more programs including instructions for presenting, via a display, in a computer-generated environment, a representation of an object, wherein one or more aspects of the product are configurable in response to receiving, via one or more input devices, one or more user inputs, while presenting the representation of the product, receiving, via the one or more input devices, a user input corresponding to a request to present a demonstration of the product and a selection input directed to virtual content, and in response to receiving the user input corresponding to the request to present the demonstration of the product, providing, via the display, a demonstration associated with one or more features of the product in association with the virtual content.

Some examples of the disclosure are directed to an information processing apparatus for use in an electronic device, the information processing apparatus comprising means for presenting, via a display, in a computer-generated environment, a representation of an object, wherein one or more aspects of the object are configurable in response to receiving, via one or more input devices, one or more user inputs, means for, while presenting the representation of the object, receiving, via the one or more input devices, a user input corresponding to a request to present a demonstration of the object and a selection input directed to virtual content, and means for, in response to receiving the user input corresponding to the request to present the demonstration of the object, providing, via the display, a demonstration associated with one or more features of the object in association with the virtual content.

Some examples of the disclosure are directed to an electronic device, comprising one or more processors, memory, and one or more programs, wherein the one or more programs are stored in the memory and configured to be executed by the one or more processors, the one or more programs including instructions for performing any of the methods disclosed above.

Some examples of the disclosure are directed to a non-transitory computer readable storage medium storing one or more programs, the one or more programs comprising instructions, which when executed by one or more processors of an electronic device, cause the electronic device to perform any of the methods disclosed above.

Some examples of the disclosure are directed to an electronic device, comprising one or more processors, memory, and means for performing any of the methods disclosed above.

Some examples of the disclosure are directed to an information processing apparatus for use in an electronic device, the information processing apparatus comprising means for performing any of the methods disclosed above.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method, comprising:

at an electronic device in communication with a display and one or more input devices:

presenting, via the display, in a three-dimensional environment, a representation of an object, wherein one or more aspects of the object are configurable in response to receiving, via the one or more input devices, one or more user inputs;

while presenting the representation of the object, receiving, via the one or more input devices, a user input corresponding to a request to present a demonstration of the object and a selection input directed to virtual content; and in response to receiving the user input corresponding to the request to present the demonstration of the object, providing, via the display, a demonstration associated with one or more features of the object in association with the virtual content, wherein providing the demonstration includes simulating operation of one or more sensors of the object in the three-dimensional environment, wherein simulating the operation of the one or more sensors of the object in the three-dimensional environment includes an interaction with one or more characteristics of the three-dimensional environment.

2. The method of claim 1, further comprising displaying one or more representations of one or more virtual environments that are selectable to display a respective virtual environment in the three-dimensional environment;

wherein the selection input directed to virtual content comprises a selection input directed to a first representation of the one or more representations associated with a first virtual environment; and wherein providing the demonstration associated with one or more features of the object in association with the virtual content includes updating the three-dimensional environment to include the first virtual environment.

3. The method of claim 2, further comprising:

while displaying the first virtual environment:

displaying a first representation of a first hand of a user and the representation of the object at a location associated with the first representation of the first hand;

detecting, via the one or more input devices, a respective user input;

in accordance with a determination that the respective user input includes a movement of the first hand of the user:

moving the representation of the first hand of the user in accordance with the movement of the first hand of the user; and moving the representation of the object in accordance with the movement of the representation of the first hand of the user; and in accordance with a determination that the respective user input includes a user input directed to the representation of the object corresponding to a request to perform a first operation associated with the object, performing the first operation.

4. The method of claim 3, wherein:

the object includes one or more cameras; and the representation of the object includes a representation of a display, the method further comprising:

detecting a user input directed to an affordance displayed on the representation of the display corresponding to a request to take a picture using the one or more cameras of the object; and in response to detecting the user input directed to the affordance, displaying a simulation of the representation of the object taking a picture of a respective portion of the first virtual environment.

5. The method of claim 1, further comprising:

providing the demonstration associated with one or more features of the object includes providing an audible tutorial of the one or more features of the object.

6. The method of claim 1, wherein providing the demonstration associated with the one or more features of the object includes providing a demonstration associated with the one or more aspects of the object configurable in response to receiving the one or more inputs.

7. The method of claim 1, further comprising:

initiating a process to configure the one or more aspects of the object, wherein the process to configure the one or more aspects of the object includes displaying one or more representations of a first set of components compatible with a first aspect of the object:

detecting, via the one or more input devices, a plurality of user inputs including a selection input performed by a hand of a user directed to a first representation of the one or more representations of the first set of components associated with a first part and a movement of the hand of the user while maintaining the selection input to a location on the representation of the object associated with the first aspect of the object; and in response to detecting the plurality of user inputs, configuring the first aspect of the object with the first part.

8. The method of claim 1, further comprising:

initiating a process to configure the one or more aspects of the object;

during the process to configure the one or more aspects of the object:

detecting, via the one or more input devices, a selection input performed by a hand of a user directed to a respective location on the representation of the object associated with a respective aspect of the object; and in response to detecting the selection input directed to the respective location on the representation of the object associated with the respective aspect of the object, displaying one or more representations of a respective set of components compatible with the respective aspect of the object.

9. The method of claim 1, wherein simulating operation of one or more sensors of the object in the three-dimensional environment includes displaying a simulation of the representation of the object taking a picture of a respective portion of the three-dimensional environment.

10. An electronic device, comprising:

one or more processors;

memory; and one or more programs, wherein the one or more programs are stored in the memory and configured to be executed by the one or more processors, the one or more programs including instructions for:

presenting, via a display, in a three-dimensional environment, a representation of an object, wherein one or more aspects of the object are configurable in response to receiving, via one or more input devices, one or more user inputs;

while presenting the representation of the object, receiving, via the one or more input devices, a user input corresponding to a request to present a demonstration of the object and a selection input directed to virtual content; and in response to receiving the user input corresponding to the request to present the demonstration of the object, providing, via the display, a demonstration associated with one or more features of the object in association with the virtual content, wherein providing the demonstration includes simulating operation of one or more sensors of the object in the three-dimensional environment, wherein simulating the operation of the one or more sensors of the object in the three-dimensional environment includes an interaction with one or more characteristics of the three-dimensional environment.

11. The electronic device of claim 10, the one or more programs including instructions for displaying one or more representations of one or more virtual environments that are selectable to display a respective virtual environment in the three-dimensional environment;

wherein the selection input directed to virtual content comprises a selection input directed to a first representation of the one or more representations associated with a first virtual environment; and wherein providing the demonstration associated with one or more features of the object in association with the virtual content includes updating the three-dimensional environment to include the first virtual environment.

12. The electronic device of claim 11, the one or more programs including instructions for:

while displaying the first virtual environment:

displaying a first representation of a first hand of a user and the representation of the object at a location associated with the first representation of the first hand;

detecting, via the one or more input devices, a respective user input;

in accordance with a determination that the respective user input includes a movement of the first hand of the user:

moving the representation of the first hand of the user in accordance with the movement of the first hand of the user; and moving the representation of the object in accordance with the movement of the representation of the first hand of the user; and in accordance with a determination that the respective user input includes a user input directed to the representation of the object corresponding to a request to perform a first operation associated with the object, performing the first operation.

13. The electronic device of claim 12, wherein:

the object includes one or more cameras; and the representation of the object includes a representation of a display, the one or more programs including instructions for:

detecting a user input directed to an affordance displayed on the representation of the display corresponding to a request to take a picture using the one or more cameras of the object; and in response to detecting the user input directed to the affordance, displaying a simulation of the representation of the object taking a picture of a respective portion of the first virtual environment.

14. The electronic device of claim 10, the one or more programs including instructions for:

providing the demonstration associated with one or more features of the object includes providing an audible tutorial of the one or more features of the object.

15. The electronic device of claim 10, wherein providing the demonstration associated with the one or more features of the object includes providing a demonstration associated with the one or more aspects of the object configurable in response to receiving the one or more inputs.

16. The electronic device of claim 10, the one or more programs including instructions for:

initiating a process to configure the one or more aspects of the object, wherein the process to configure the one or more aspects of the object includes displaying one or more representations of a first set of components compatible with a first aspect of the object:

detecting, via the one or more input devices, a plurality of user inputs including a selection input performed by a hand of a user directed to a first representation of the one or more representations of the first set of components associated with a first part and a movement of the hand of the user while maintaining the selection input to a location on the representation of the object associated with the first aspect of the object; and in response to detecting the plurality of user inputs, configuring the first aspect of the object with the first part.

17. The electronic device of claim 10, the one or more programs including instructions for:

initiating a process to configure the one or more aspects of the object;

during the process to configure the one or more aspects of the object:

detecting, via the one or more input devices, a selection input performed by a hand of a user directed to a respective location on the representation of the object associated with a respective aspect of the object; and in response to detecting the selection input directed to the respective location on the representation of the object associated with the respective aspect of the object, displaying one or more representations of a respective set of components compatible with the respective aspect of the object.

18. A non-transitory computer readable storage medium storing one or more programs, the one or more programs comprising instructions, which when executed by one or more processors of an electronic device, cause the electronic device to:

present, via a display, in a three-dimensional environment, a representation of an object, wherein one or more aspects of the object are configurable in response to receiving, via one or more input devices, one or more user inputs;

while presenting the representation of the object, receive, via the one or more input devices, a user input corresponding to a request to present a demonstration of the object and a selection input directed to virtual content; and in response to receiving the user input corresponding to the request to present the demonstration of the object, providing, via the display, a demonstration associated with one or more features of the object in association with the virtual content, wherein providing the demonstration includes simulating operation of one or more sensors of the object in the three-dimensional environment, wherein simulating the operation of the one or more sensors of the object in the three-dimensional environment includes an interaction with one or more characteristics of the three-dimensional environment.

19. The non-transitory computer readable storage medium of claim 18, the instructions, when executed by the one or more processors, further cause the electronic device to display one or more representations of one or more virtual environments that are selectable to display a respective virtual environment in the three-dimensional environment;

wherein the selection input directed to virtual content comprises a selection input directed to a first representation of the one or more representations associated with a first virtual environment; and wherein providing the demonstration associated with one or more features of the object in association with the virtual content includes updating the three-dimensional environment to include the first virtual environment.

20. The non-transitory computer readable storage medium of claim 19, the instructions, when executed by the one or more processors, further cause the electronic device to:

while displaying the first virtual environment:

display a first representation of a first hand of a user and the representation of the object at a location associated with the first representation of the first hand;

detect, via the one or more input devices, a respective user input;

in accordance with a determination that the respective user input includes a movement of the first hand of the user:

move the representation of the first hand of the user in accordance with the movement of the first hand of the user; and move the representation of the object in accordance with the movement of the representation of the first hand of the user; and in accordance with a determination that the respective user input includes a user input directed to the representation of the object corresponding to a request to perform a first operation associated with the object, perform the first operation.

21. The non-transitory computer readable storage medium of claim 20, wherein:

the object includes one or more cameras; and the representation of the object includes a representation of a display, the instructions, when executed by the one or more processors, further cause the electronic device to:

detect a user input directed to an affordance displayed on the representation of the display corresponding to a request to take a picture using the one or more cameras of the object; and in response to detecting the user input directed to the affordance, display a simulation of the representation of the object taking a picture of a respective portion of the first virtual environment.

22. The non-transitory computer readable storage medium of claim 18, the instructions, when executed by the one or more processors, further cause the electronic device to:

provide the demonstration associated with one or more features of the object includes providing an audible tutorial of the one or more features of the object.

23. The non-transitory computer readable storage medium of claim 18, wherein providing the demonstration associated with the one or more features of the object includes providing a demonstration associated with the one or more aspects of the object configurable in response to receiving the one or more inputs.

24. The non-transitory computer readable storage medium of claim 18, the instructions, when executed by the one or more processors, further cause the electronic device to:

initiate a process to configure the one or more aspects of the object, wherein the process to configure the one or more aspects of the object includes displaying one or more representations of a first set of components compatible with a first aspect of the object:

detect, via the one or more input devices, a plurality of user inputs including a selection input performed by a hand of a user directed to a first representation of the one or more representations of the first set of components associated with a first part and a movement of the hand of the user while maintaining the selection input to a location on the representation of the object associated with the first aspect of the object; and in response to detecting the plurality of user inputs, configure the first aspect of the object with the first part.

25. The non-transitory computer readable storage medium of claim 18, the instructions, when executed by the one or more processors, further cause the electronic device to:

initiate a process to configure the one or more aspects of the object;

during the process to configure the one or more aspects of the object:

detect, via the one or more input devices, a selection input performed by a hand of a user directed to a respective location on the representation of the object associated with a respective aspect of the object; and in response to detecting the selection input directed to the respective location on the representation of the object associated with the respective aspect of the object, display one or more representations of a respective set of components compatible with the respective aspect of the object.

* * * * *